United States Patent [19]

Li

[11] Patent Number: 5,549,953

[45] Date of Patent: Aug. 27, 1996

[54] OPTICAL RECORDING MEDIA HAVING OPTICALLY-VARIABLE SECURITY PROPERTIES

[75] Inventor: Li Li, Gloucester, Canada

[73] Assignee: National Research Council of Canada, Ottawa, Canada

[21] Appl. No.: 53,678

[22] Filed: Apr. 29, 1993

[51] Int. Cl.[6] ............................................. B32B 3/00
[52] U.S. Cl. ..................... 428/64.1; 420/64.2; 420/64.3; 420/64.4; 420/64.5; 420/64.8; 420/913; 420/916; 430/270.1; 430/270.11; 430/270.12; 430/270.13; 430/270.14; 430/475; 430/945; 369/283; 369/288
[58] Field of Search ........................... 428/64, 65, 457, 428/913, 916, 64.1, 64.2, 64.3, 64.4, 64.5, 64.8; 430/270, 945, 270.1, 270.11, 270.12, 270.13, 270.14; 346/7 L, 135.1; 369/283, 288

[56] References Cited

U.S. PATENT DOCUMENTS 5,147,701 9/1992 Furukawa ........................ 428/64
5,154,957 10/1992 Yamada et al. ..................... 428/64
5,196,250 3/1993 Abe et al. .......................... 428/64

*Primary Examiner*—Patrick J. Ryan
*Assistant Examiner*—Elizabeth Evars
*Attorney, Agent, or Firm*—Neil Teitelbaum & Associates

[57] ABSTRACT

The prevention of counterfeiting of currencies, passports, cheques, bank cards, credit cards, optical disks and the like is addressed by introducing thin film structures having both optically-variable security properties and encoded optical data decodable by optical means. The thin film structures comprise a substrate and a multilayer interference coating carried by the substrate, producing an inherent color shift with a change of viewing angle. The multilayer interference coating has a dielectric material which is transparent and the recording layer made of a light absorbing material, a crystalline-structural changing material or a magneto-optic material. The encoded data is in the form of bar codes or digital data. The information is encoded by photolithographic means or by optical recording means. The encoded data is retrieved by an optical recording system having a light source and an optical guiding system and a light detector.

15 Claims, 26 Drawing Sheets

OPTICAL RECORDING MEDIA HAVING OPTICALLY-VARIABLE SECURITY PROPERTIES

FIELD OF THE INVENTION

This invention relates to a thin film structure having optically-variable characteristics, and more particularly to a structure for storing data decodable by optical recording means.

BACKGROUND OF THE INVENTION

Optical media having a high data density are ideal for storing large amounts of information, such as reference data bases, newspapers and books, library flies, etc. Consequently, this makes them valuable and a potential target for counterfeiting. It is believed that in the future the counterfeiting of optical media will become a problem. Currently, optical media are protected in a limited way by software or by electronic devices. In principle, security devices such as optical thin films, holograms, gratings and micro-prisms can be attached to optical media to protect them. However, in practice these attached security devices will to some extent affect the normal operation of the optical media or limit the working area. Therefore, it would be desirable for the media to have a built-in security feature which will not interfere with the normal operation of the media.

In addition to the counterfeiting of optical media, the counterfeiting of currencies, passports, credit cards, bank cards and other articles is also a concern. Currently, optically-variable security devices, such as thin films, holograms, gratings, micro-prisms, are commonly used to protect those articles; their optical features can be easily recognized by the public at large. Optically-variable thin film security devices exhibiting a color change with a shift in viewing angle have been disclosed in U.S. Pat. No. 3,858,977 issued in January of 1975 in the name of Baird et al. Such devices are successfully used on large denominations of Canadian bank notes and on drivers licenses in some jurisdictions. However it is believed that in the future, there will be a need for additional security. Also, in some applications, the ability to store digital data is required.

In an attempt to address the above issues, U.S. Pat. No. 5,009,486 issued Apr. 23, 1991 in the name of Dobrowolski et al. describes a form depicting, optical interference authenticating device. Dobrowolski et al. teach the introduction of additional patterns in thin film security devices by using masks during their deposition or by infrared laser burning to remove one or more layers of the thin film system. U.S. Pat. No. 4,838,648 in the name of Phillips et al. issued Jun. 13, 1989 discloses a thin film structure having both magnetic and optically-variable characteristics. The thin film structure includes a magnetic recording layer having encoded data, decodable by magnetic means.

OBJECT OF THE INVENTION

It is generally believed that in the future optical recording will replace magnetic recording and become the dominant way of storing information. It provides high data density and long lasting life. However, it would be desirable for optical media to have a built-in security feature that would not interfere with the normal operation of the media. Secondly, although the inventions disclosed by Dobrowolski et al. (U.S. Pat. No. 5,009,486) and Phillips et al. (U.S. Pat. No. 4,838,648) appear to adequately perform their intended function of providing hard to simulate thin film security devices and magnetic thin film security devices, it would be desirable to have a thin film security device that could store information decodable by optical recording means.

It is, therefore, an object of this invention to provide read-only, write-once and erasable optical recording media with optically-variable security features.

It is another object of the invention to provide a thin film security device having properties of an ordinary thin film security device as well as properties of an ordinary read-only, write-once or erasable optical medium.

STATEMENT OF THE INVENTION

In accordance with one aspect of the invention there is provided a thin film structure for storing data and having optically-variable properties, comprising: a substrate and a multilayer interference coating carried by the substrate for producing a color shift with a change of viewing angle, said interference coating including a recording layer made of a light absorbing material, said recording layer having optically decodable data encoded therein.

In accordance with the invention there is further provided a thin film structure for storing data and having optically-variable properties, comprising: a substrate and a multilayer interference coating carried by the substrate for producing a color shift with a change of viewing angle, said interference coating including a recording layer made of a crystalline-structural phase changing material, said recording layer having optically decodable data encoded therein.

In accordance with the invention there is further provided a thin film structure for storing data and having optically-variable properties, comprising: a substrate and a multilayer interference coating carried by the substrate for producing a color shift with a change of viewing angle, said interference coating including a recording layer made of a magneto-optic material, said recording layer having optically decodable data encoded therein.

In accordance with the invention there is further provided a thin film security device for storing information such as bar codes or digital data. The thin film structure has optically-variable properties allowing visual verification of the device's authenticity.

BRIEF DESCRIPTION OF THE DRAWINGS

Exemplary embodiments of the invention will be described in conjunction with the drawings in which.

2FIG. 20 is a graph showing the reflectance curves of example B1 corresponding to "0" and "1" bit phases.

Figure 21:
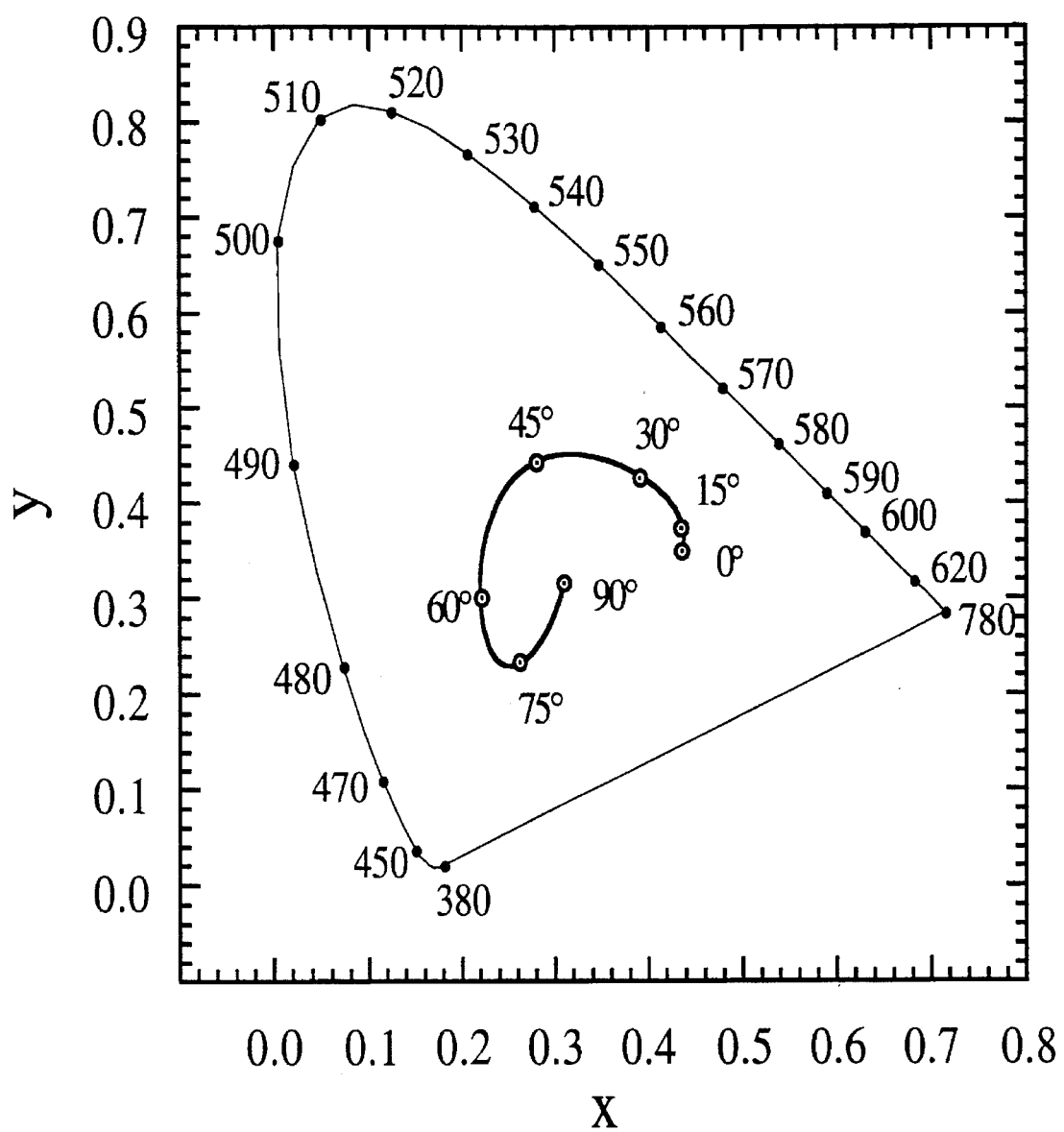
Figure 22:
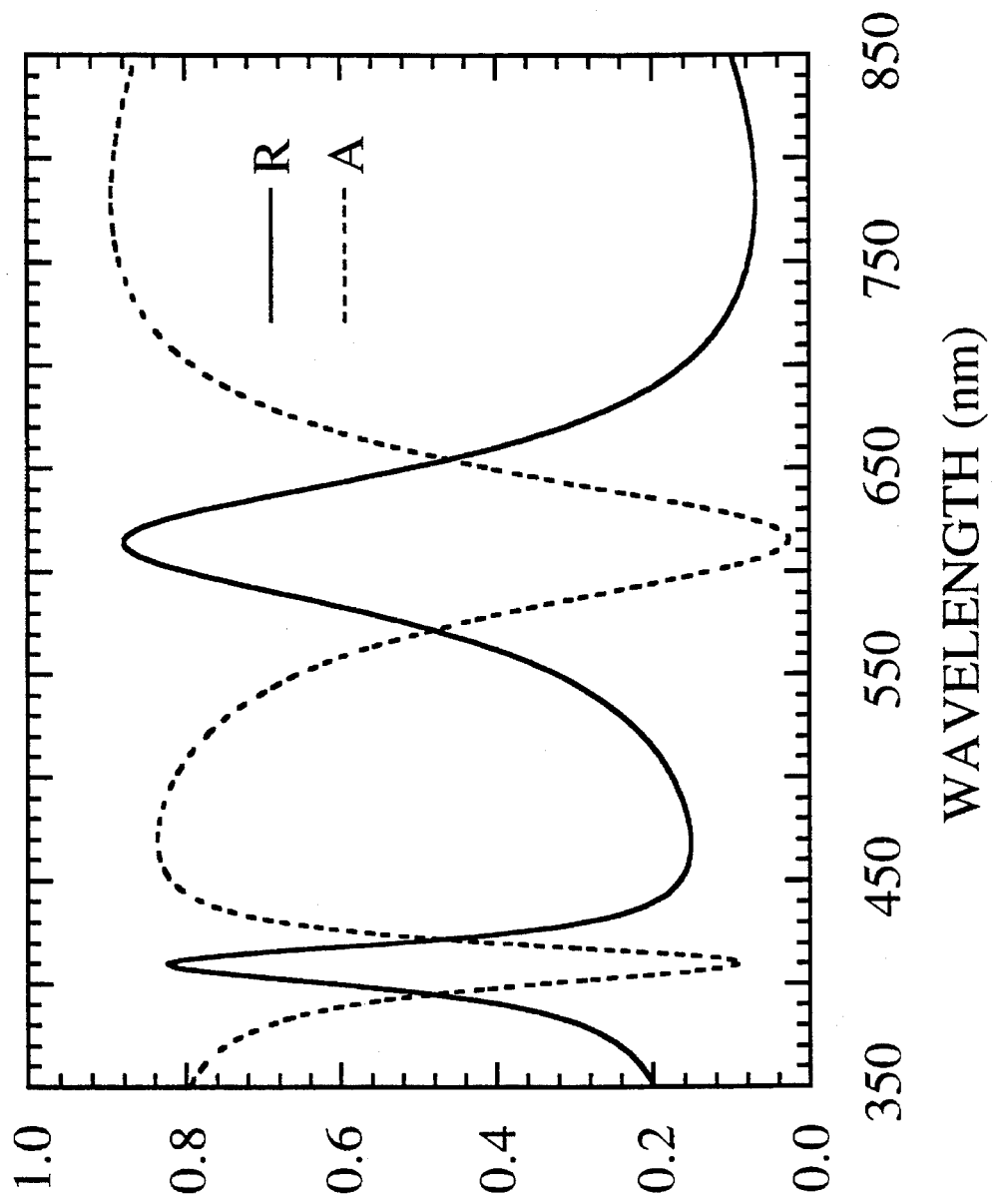
Figure 23:
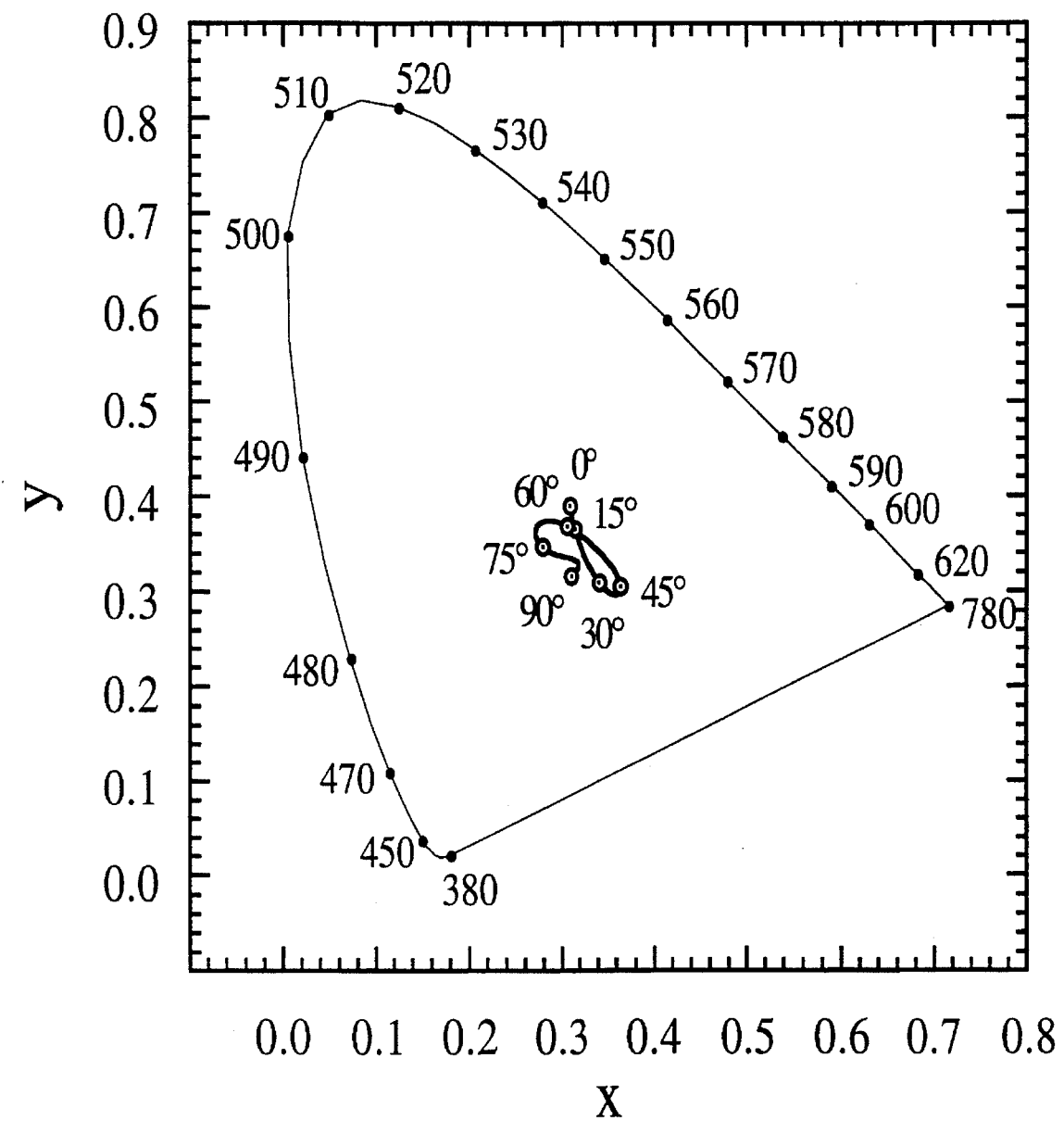
Figure 24:
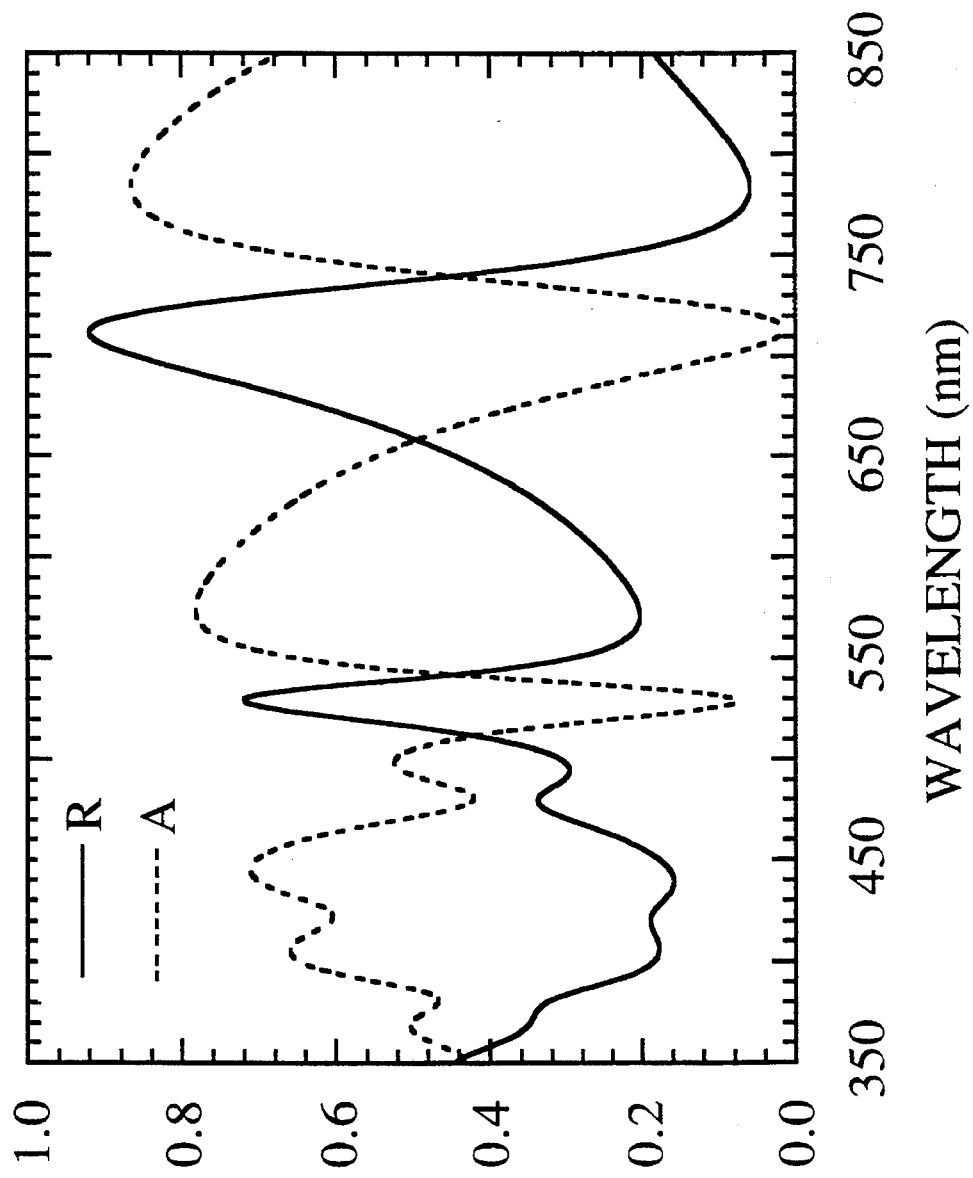
Figure 25:
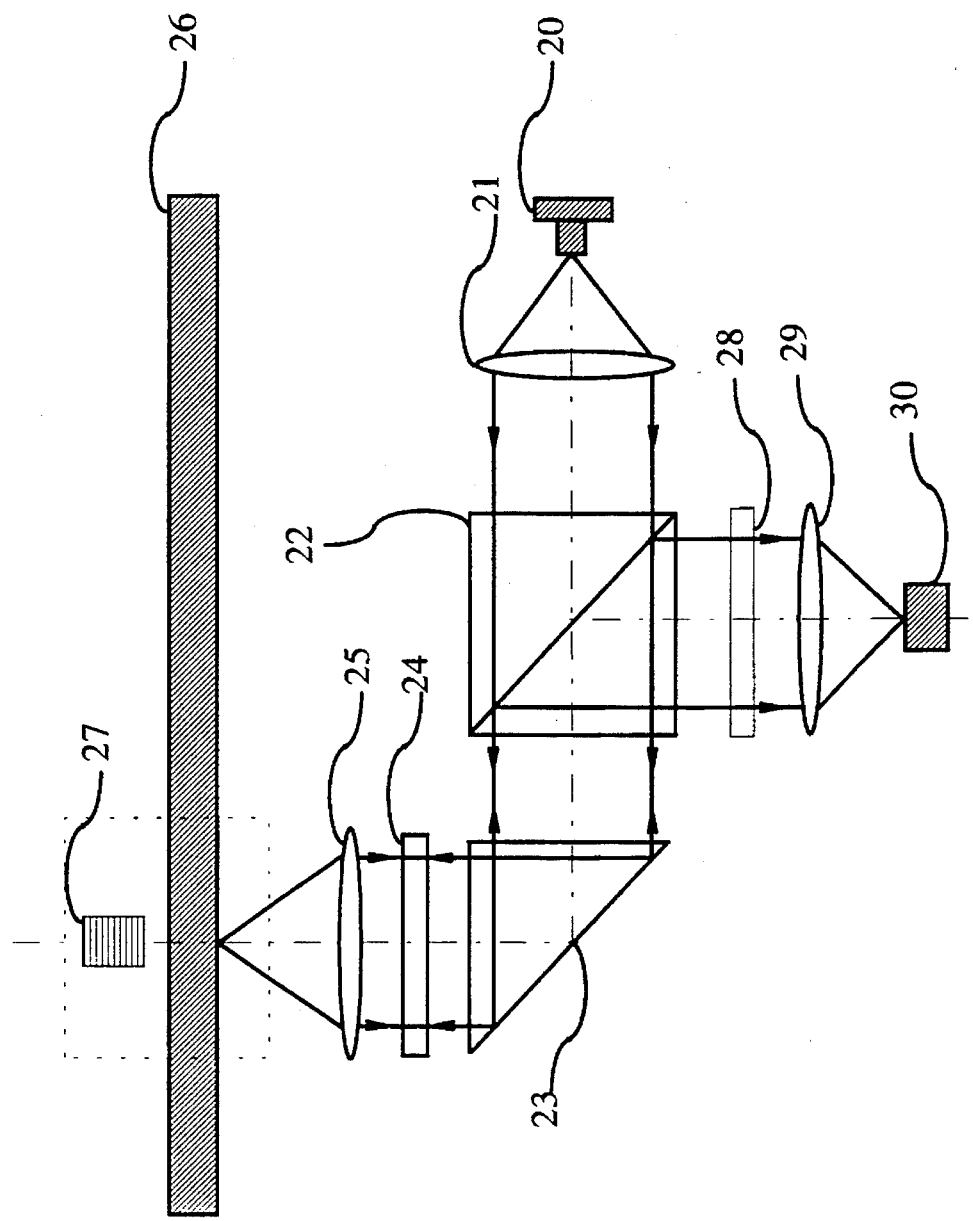

FIG. 21 is a graph showing the variation of CIE coordinates with angle of incidence of example C1 defined in Table III;

FIG. 22 is a graph showing the reflectance and absorptance curves of example C1 at normal incidence;

FIG. 23 is a graph showing the variation of CIE coordinates with angle of incidence of example C2 defined in Table III;

FIG. 24 is a graph showing the reflectance and absorptance curves of example C2 at normal incidence;

FIG. 25 is a schematic diagram of an optical recording system applying an optical recording medium having optically-variable security properties in accordance with the invention;

FIG. 26 is a diagram that shows the detailed portion of the area marked with dotted lines in FIG. 25. FIG. 26(*a*), (*b*) and (*c*) correspond to a read-only or write-once, a phase change, and a magneto-optic medium respectively.

DETAILED DESCRIPTION

1. Ordinary thin film security devices

Light interference in a thin film system occurs when the thicknesses of the layers in the film system are of the same order as the wavelength of the light. The transmission, reflection and absorption of the light in a thin film system depend on this interference effect. In the visible spectrum, the interference effect can be observed as certain colors of transmission and reflection, these colors being called interference colors. The actual transmission and reflection colors of a thin film system depend not only on the incident light and the system's parameters such as the thickness and optical constant of each layer, but also on the angle of incidence. As the incident angle changes, the effective thickness of each layer changes, and therefore the colors perceived by a viewer will also change. This color change feature with angle of incidence distinguishes interference colors from colors based on absorption; for example, the colors of dyes and pigments do not change with angle of incidence. Furthermore, the iridescent colors of the thin films can not be duplicated by a commercial reproduction machine. Thus optical thin films can be used as security devices against counterfeiting.

The color of an object can be defined in several ways recommended by the Commission Internationale de L'Eclairage (CIE). The common approach is to use the chromaticity diagram in which a color is defined by three parameters, the x and y coordinates on the CIE color diagram, and luminance L. Once the illuminating light is known, the perceived color of a thin film system depends upon its layer structure. The layer structure can be chosen to meet particular requirements, for example, the colors at different incident angles. It is possible to enhance the color change effect with angle of incidence for anti-counterfeiting purposes or to minimize it for other applications. The thin film structure may have as few as one or two layers or may have more than 100 layers.

2. Ordinary optical recording media

Optical signals are used for retrieving digital data stored on optical recording media. The data may be stored by the use of optical recording means or other means that will be described hereafter. Optical recording media are categorized on the basis of their writing and reading mechanisms. Typically, there are three general categories: read-only, write-once, and erasable. A focused laser beam is used to read information from all three types of media. When the reading signal is low, it corresponds to a logic "0", and conversely when the reading signal is high, it corresponds to a logic "1", or vice versa. A laser beam can be focused onto a very small spot, for example, 1 µm by a near infrared laser operating in the 800 nm region, resulting in $10^6$ bits/mm$^2$ data density. This is very high when compared to magnetic recording. The shorter the laser wavelength, the smaller the focus spot will be. The smaller the focus spot, the smaller the recording unit may be detected. In addition to the high data density, advantageously, optical recording media are used in a non-contact configuration; the medium therefore lasts much longer than other contact-type recording media.

3. Optical recording media having optically-variable security properties

The object of the invention is to provide a thin film structure having color change properties and optical recording properties. However, it is not possible to simply combine the ordinary thin film security devices with the ordinary optical recording media or to use one of the structures for the purpose of the others. Because of the interference of light the superposition of the two structures will result in two devices interfering with each other and cause both devices to lose their original intended functions. In addition, currently, the ordinary optical recording media operate at the near infrared spectral region from 780 nm to 900 nm where inexpensive diode lasers are commercially available. The structures of the media are chosen only to meet optical recording requirements, for example, the reflection and absorption characteristics at the laser wavelength in the near infrared region. The visible optical performance of the media is not of consequence. Furthermore, up to now, the ordinary thin film security devices and magnetic thin film security devices are designed for the color change only. The optical performances of these security devices outside of the visible part of the spectrum are also not considered.

In accordance with the invention a new thin film structure is provided. This new thin film structure combines the performance, not the structure, of an ordinary thin film security device with that of an ordinary optical medium. The color of the structure changes with viewing angle. In addition, information such as bar codes and digital data decodable by optical recording means can be encoded onto the structure. The structure, therefore, can be used as a secured medium for optical recording. Based on its reading and writing mechanisms the structure can also be divided into three main categories: the read-only, write-once and erasable. In addition, with the encoded additional optical information, the structure can be employed as an enhanced thin film security device for anti-counterfeiting purposes.

Many embodiments of such a new thin film structure may be designed to meet the requirements for color change and for optical recording. The embodiments may have many or only a few layers. One embodiment, shown in FIG. 1(a) comprises a substrate 11 made of glass, plastic, or metal and an interference coating carried by the substrate for producing a color shift with a change of viewing angle. The interference coating includes a reflecting stack 12 carried by the substrate 11. The stack 12 can be a single reflecting layer made of a material such as aluminum (Al), chromium (Cr), cobalt (Co), copper (Cu), gold (Au), hafnium (Hf), Inconel, molybdenum (Mo), nickel, niobium (Nb), platinum (Pt), silicon, silver (Ag), tantalum (Ta), titanium (Ti), tungsten (W), yttrium (Y), zirconium (Zr), or other highly reflecting materials; or a multilayer stack comprising dielectric layers such as $Al_2O_3$, $HfO_2$, $MgF_2$, $Nb_2O_5$, $SiO_2$, $Ta_2O_5$, $TiO_2$, $Y_2O_3$, ZnS, ZnSe, and $ZrO_2$; or, alternatively, the combinations of the above two material groups. The interference coating also includes a spacer layer 13 that is deposited onto the reflecting stack 12; the spacer layer 13 is made of a transparent dielectric material such as $Al_2O_3$, $HfO_2$, $MgF_2$, $Nb_2O_5$, $SiO_2$, $Ta_2O_5$, $TiO_2$, $Y_2O_3$, ZnS, ZnSe, and $ZrO_2$. A recording layer 14 is deposited on the spacer layer 13. For both read-only and write-once optical recording media, the recording layer 14 is made of a light absorbing material such as Al, Cr, Co, Cu, Ge, Au, Hf, Mo, Inconel, Ni, Nb, Pt, Si, Ag, Ta, Te, Ti, W, Yr, Zr, TeOx or organic dyes, etc. For phase change erasable recording media, the recording layer is made of a material having two stable phases such as TeGe, TeGeAs, TeGeSb, TeSeIn, TeSeSn, TeSnPb, TeOx, etc. For magneto-optic media, the recording layer is made of a magneto-optic material such as CeSb, CeSe, CoPd, CoPt, EuO, Fe/Ag, Fe/Cu, Fe/TiN, GdCo, GdFe, GdFeBi, GdFECo, GdFeSn, GdTbFe, MnAlGe, MnBi, MnCuBi, MnGaGe, MnTiBi, TbFe, TbFeCo, TmS, TmSe, and others. The recording layer 14 is protected with an optional transparent layer 15 made of a material such as $SiO_2$, $AlO_2$ or $MgF_2$. Providing a transparent substrate allows the positions of the protective layer 15 and of the substrate 11 to be interchanged as shown in FIG. 1(b). In an alternative embodiment, two identical interference coatings 17 having a structure as shown in FIG. 1(a) or FIG. 1(b) can be deposited onto opposite sides of a substrate 16 to form a double-sided recording medium as shown in FIG. 1(c).

Figure 1A:
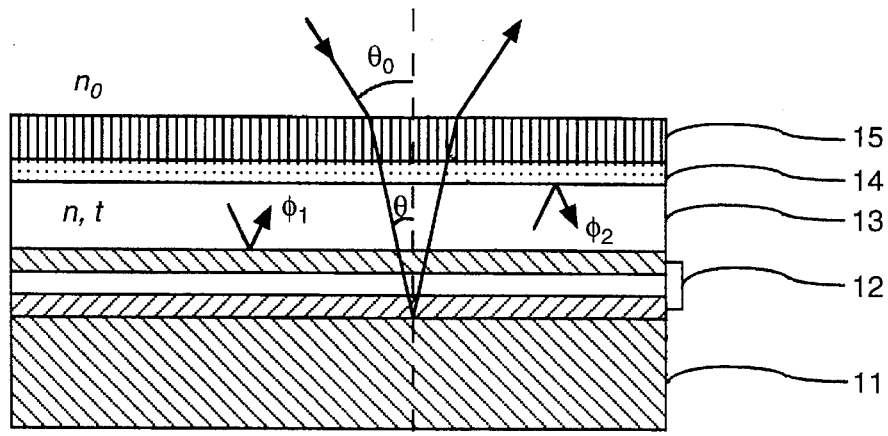
FIG 1(a) is a cross sectional view of an optical recording medium having optically-variable properties in accordance with the invention.
Figure 1B:
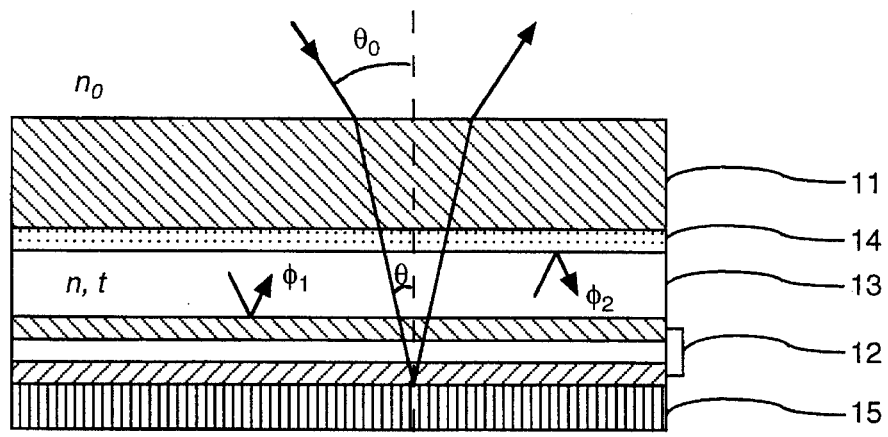
FIG. 1(b) is cross sectional view of an alternative embodiment showing light coming through a transparent substrate of an optical recording medium having optically-variable properties in accordance with the invention.
Figure 1C:
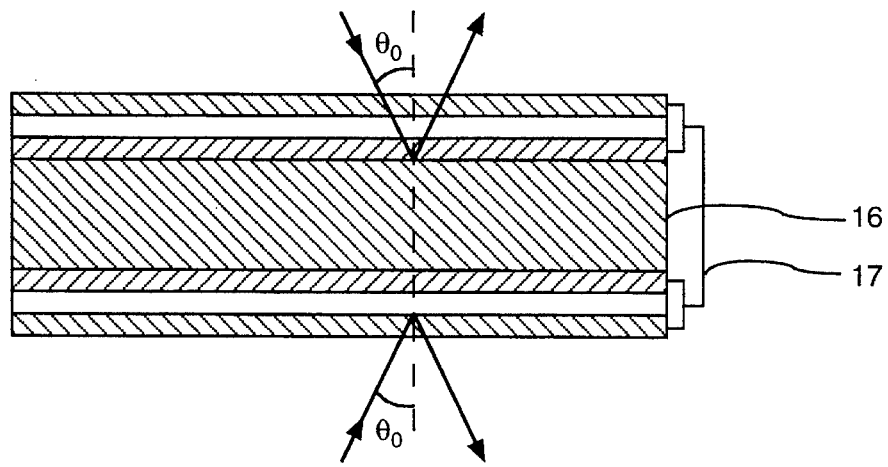
FIG 1(c) is a cross sectional view of a structure similar to that of FIG. 1(a) or (b) having a recording medium with optically-variable properties on both sides of a substrate.

Since the embodiments shown in FIGS. 1(a), 1(b), and 1(c) are similar in many respects, the following description will refer only to FIG. 1(a). Much of the description is applicable to FIGS. 1(b) and 1(c) as well.

From the optical point of view, most of optical recording materials are light absorbing. They have a reasonably high reflectance in the visible spectral region. Therefore, the recording layer 14 in FIG. 1(a) can be considered to be a reflector, and the whole structure of FIG. 1(a) can be thought to from an Fabry-Perot etalon in which the spacer layer is sandwiched between two reflectors. In such a Fabry-Perot structure, if the spacer layer is thick enough, multiple transmission and reflection peaks will exist. Because light absorbing materials are used, the light transmission across the visible spectral region will be low. According to energy conservation, the transmittance plus reflectance and absorptance is equal to the value of 1. Therefore, at wavelengths where the reflectance of light is low the absorption should be high, and the inverse is also true. The position of the peak reflectance of the structure depends on the phase thickness that is given by the equation:

$$\delta = (2\pi/\lambda) n \, t \cos \theta - \phi_1 - \phi_2 \qquad (1)$$

Here $\phi_1$ and $\phi_2$ are the phase changes on reflection at the two interfaces of the spacer layer as shown in FIG. 1(a), and t is the refractive index and the thickness of the spacer layer respectively, $\lambda$ is the wavelength, and $\theta$ is the angle of refraction in the spacer layer that is given by the equation:

$$n \sin \theta = n_0 \sin \theta_0 \qquad (2)$$

Where $n_0$ and $\theta_0$ is the refractive index and the incidence angle of the incident medium receptively.

The thicker the spacer layer, the more reflectance peaks there are and the closer the peaks will be to each other. By choosing the thickness and the refractive index of the spacer layer, one can control the number of reflectance peaks in the visible part of the spectrum and also position the reflectance peaks to obtain a desired color. As the incident angle $\theta_0$ increases, the phase thickness decreases and the reflectance peak shifts to the shorter wavelength, changing the perceived color of the structure. From Equations (1) and (2), it is apparent that the smaller the refractive index of the spacer layer, the more rapid the variation in color with angle of incidence. At the same time, by adjusting all parameters in the FIG. 1(a) structure, the reflectance and absorptance of light at the laser wavelength (usually in the near infrared region around 800 nm for most diode lasers) can be controlled to meet the requirements for optical recording.

In the design of such optical media with optically-variable features, a computer optimization program is used. When the basic structure is chosen such as that shown in FIG. 1(a), the required colors at different incident angles and the reflectance and absorptance at the laser wavelength or signal to noise ratio (SNR) for different recording media are set as targets. The program then optimizes the parameters of the structure such as the thicknesses of each layer to obtain the best solution both for color change and for optical recording.

In the following text several embodiments of the optical recording media having optically-variable security features are described. All media are designed for a laser operating at 800 nm. The color of a medium is referred to a standard Illuminant C representing a cloudy sky condition and to a standard 2° observer (CIE 1931). It is described by the CIE coordinates x, ), and the luminance L.

Five examples have been designed for a read-only or write-once medium. The examples consist of a glass substrate, an opaque aluminum reflector with a thickness≧25 nm, a dielectric spacer layer and an Inconel recording layer. In the following calculation, aluminum is used as the exit medium, therefore, the calculated absorptance can truly represent the absorption by the recording layer. The parameters of the structures and the color and recording performance of the examples are summarized in Table I. All five examples are designed for read-only or write-once optical recording. In the read-only case, the data is pre-stored by patterning the recording layer by photolithographic means. In the write-once case, the data is written by a focused laser beam. In general, for a write-once medium the recording layer should have a low heat diffusivity and a low heat capacity. According to this, Inconel is not the best choice. The reasons that Inconel is used are: 1. Inconel is a very stable material; 2. as it will be showed later, by choosing proper structure parameters, the laser energy could be efficiently absorbed by the Inconel layer; 3. if the medium works with Inconel, it will work equally well with other materials having low heat diffusivity and capacity.

Figure 2:
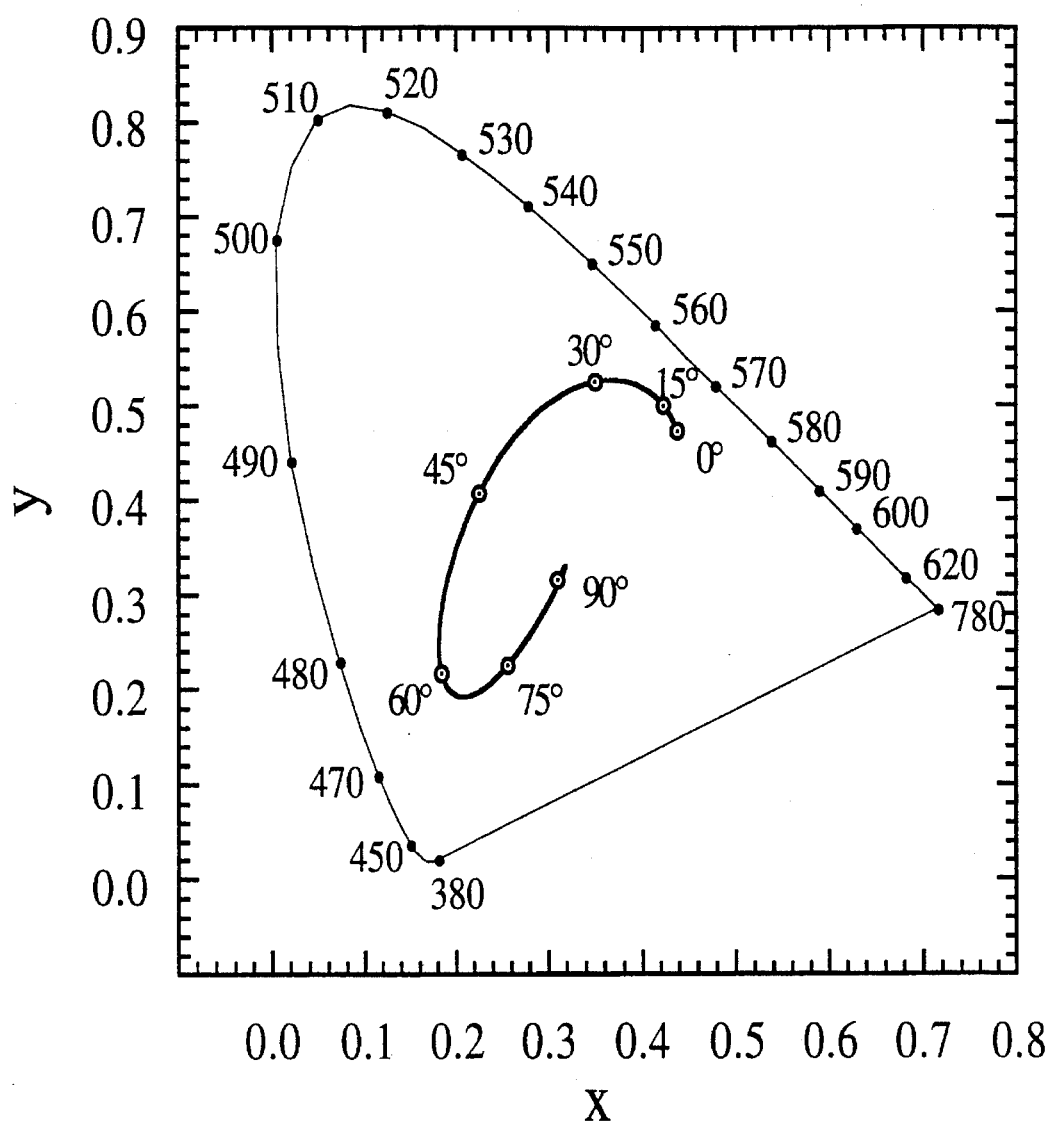
FIG. 2 is a graph showing the variation of CIE coordinates with angle of incidence of example A1 defined in Table I.
Figure 3:
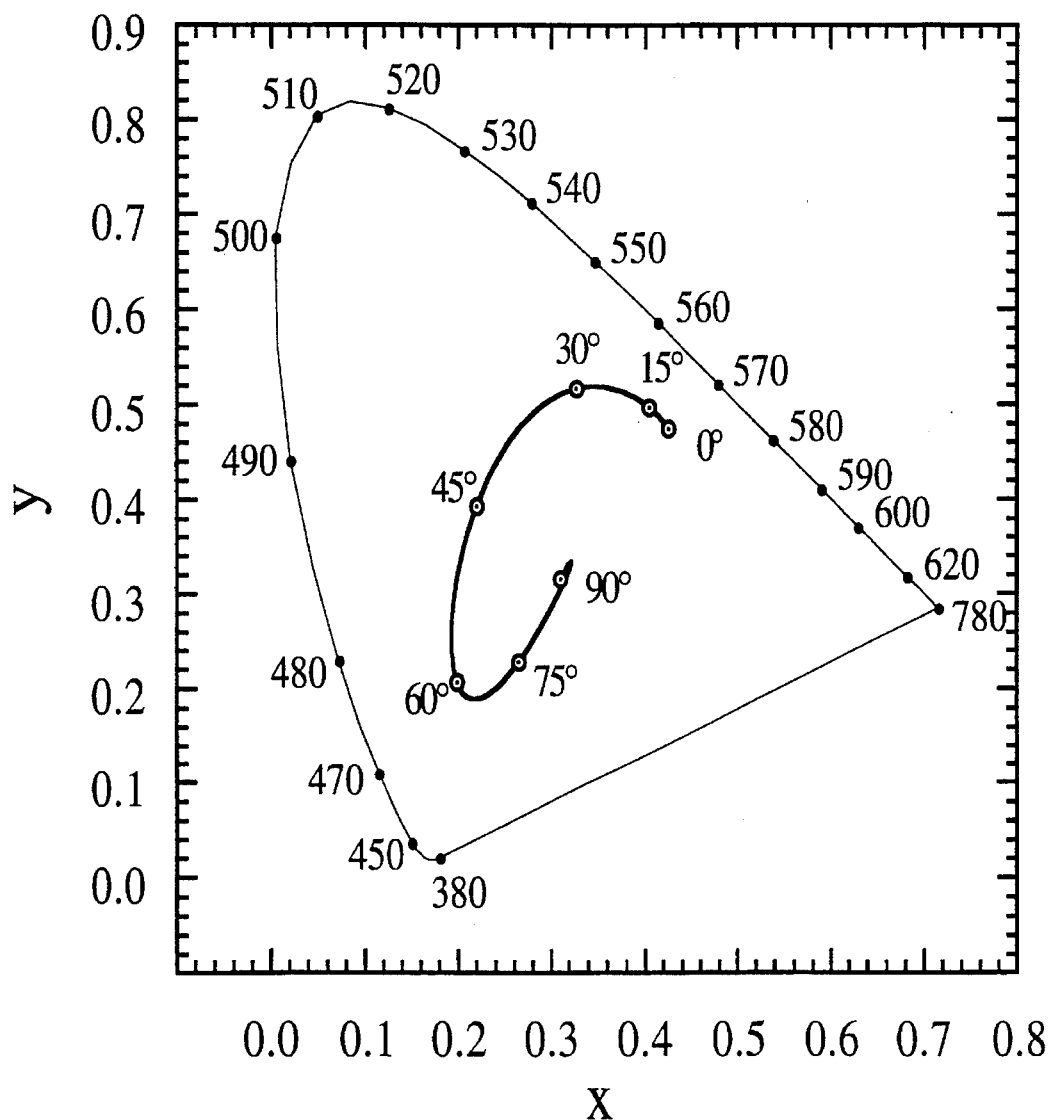
FIG. 3 is a graph showing the variation of CIE coordinates with angle of incidence of example A2 defined in Table I.
Figure 4:
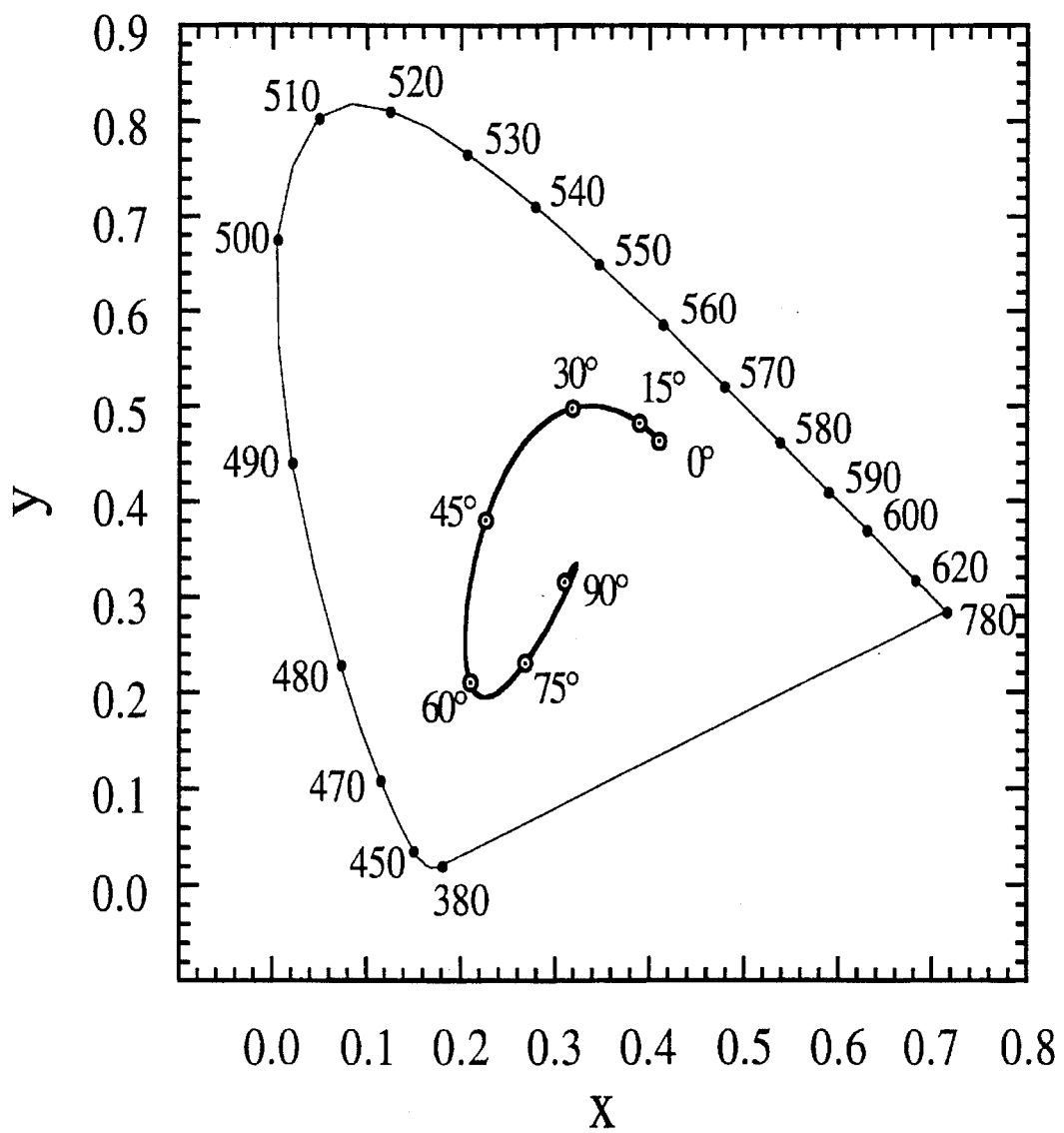
FIG. 4 is a graph showing the variation of CIE coordinates with angle of incidence of example A3 defined in Table I.

Examples A1, A2 and A3 have a similar color change characteristic but have a different reflectance and absorptance at 800 nm laser wavelength. The CIE coordinates of example A1, A2 and A3 are shown in FIGS. 2, 3 and 4 respectively. The colors of examples A1, A2 and A3 change from greenish-yellow at normal incidence to green at 45° and to whitish-purple at 75°.

Figure 5:
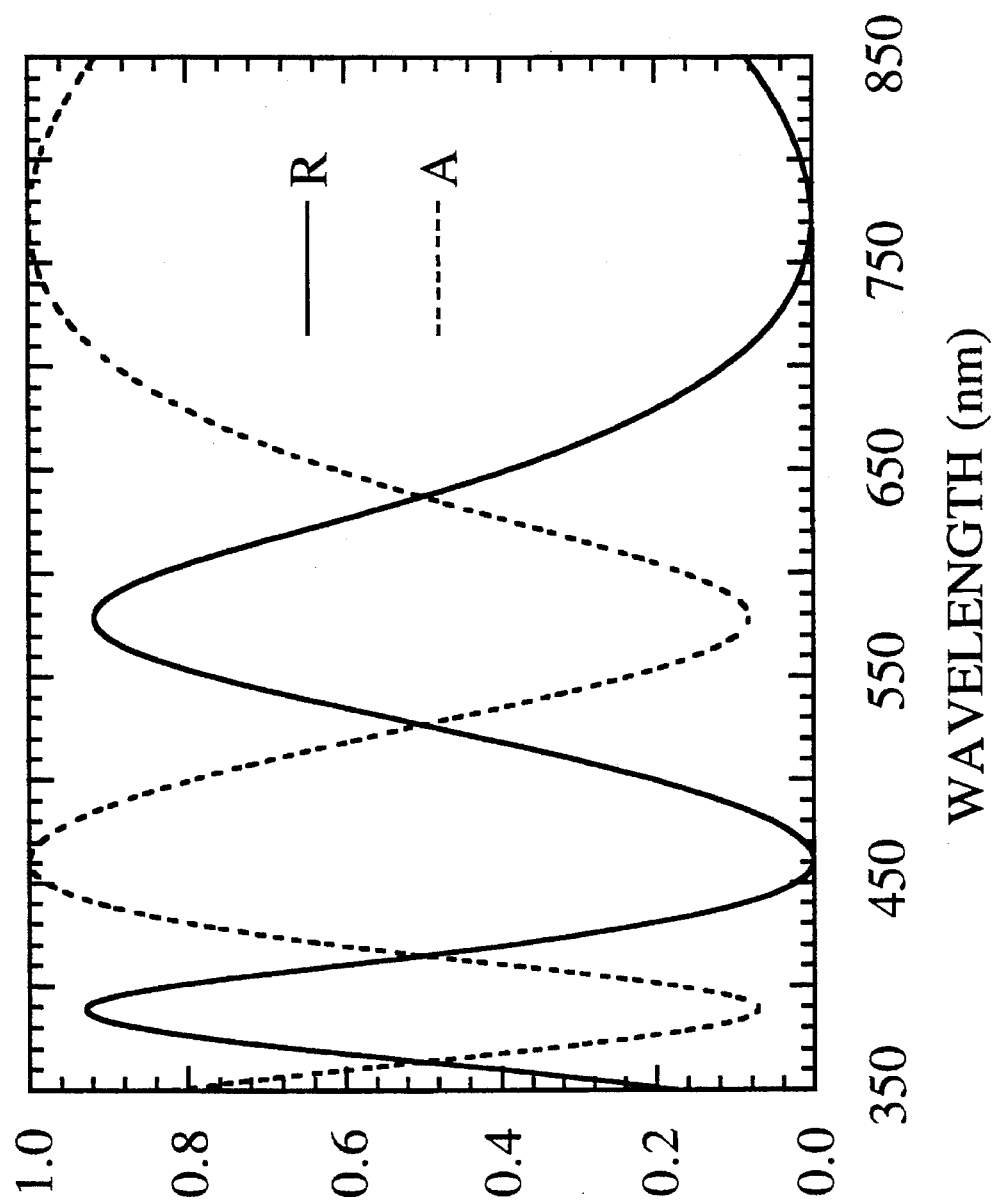
FIG. 5 is a graph showing the reflectance and absorptance curves of example A1 at normal incidence.
Figure 6:
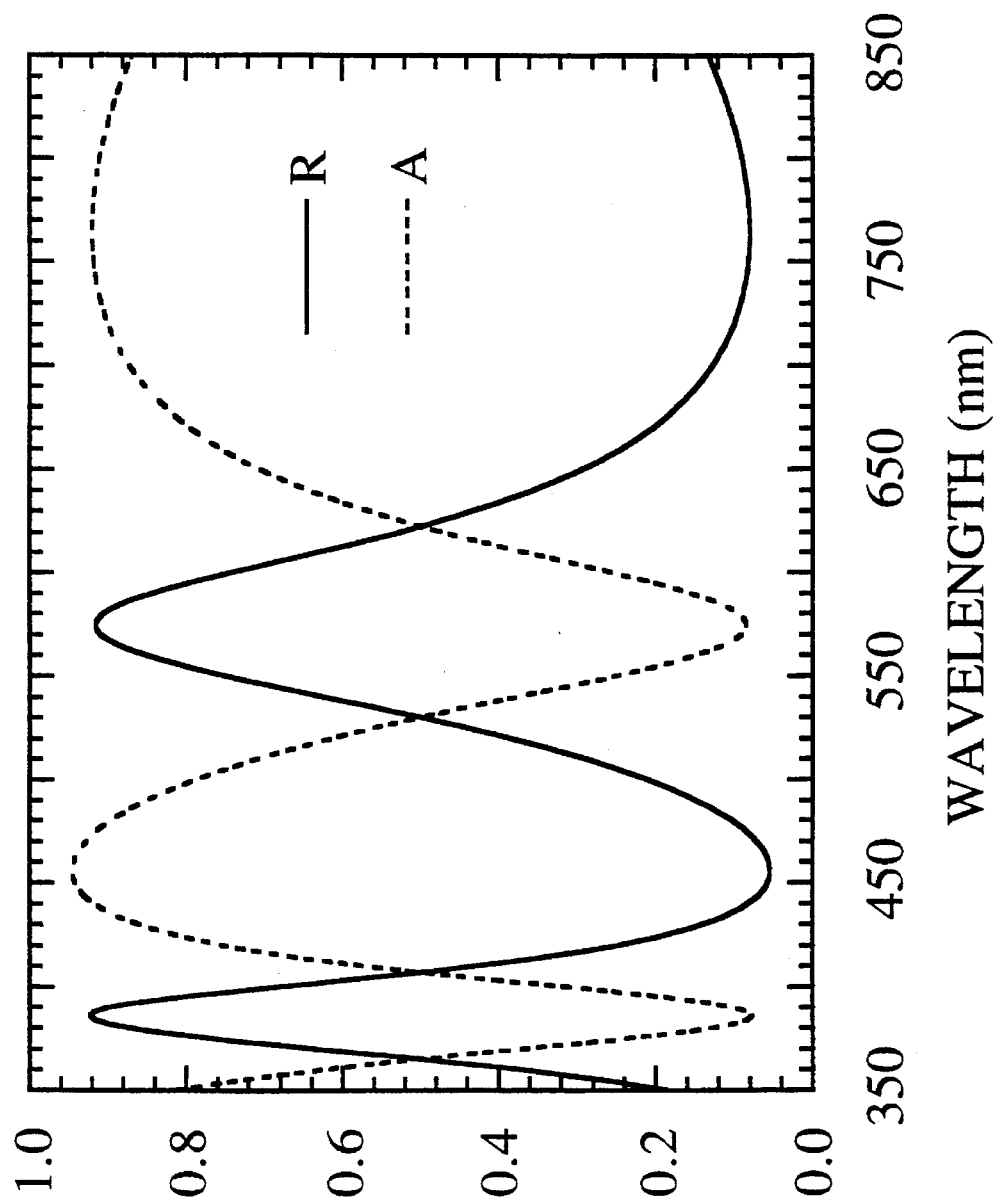
FIG. 6 is a graph showing the reflectance and absorptance curves of example A2 at normal incidence.
Figure 7:
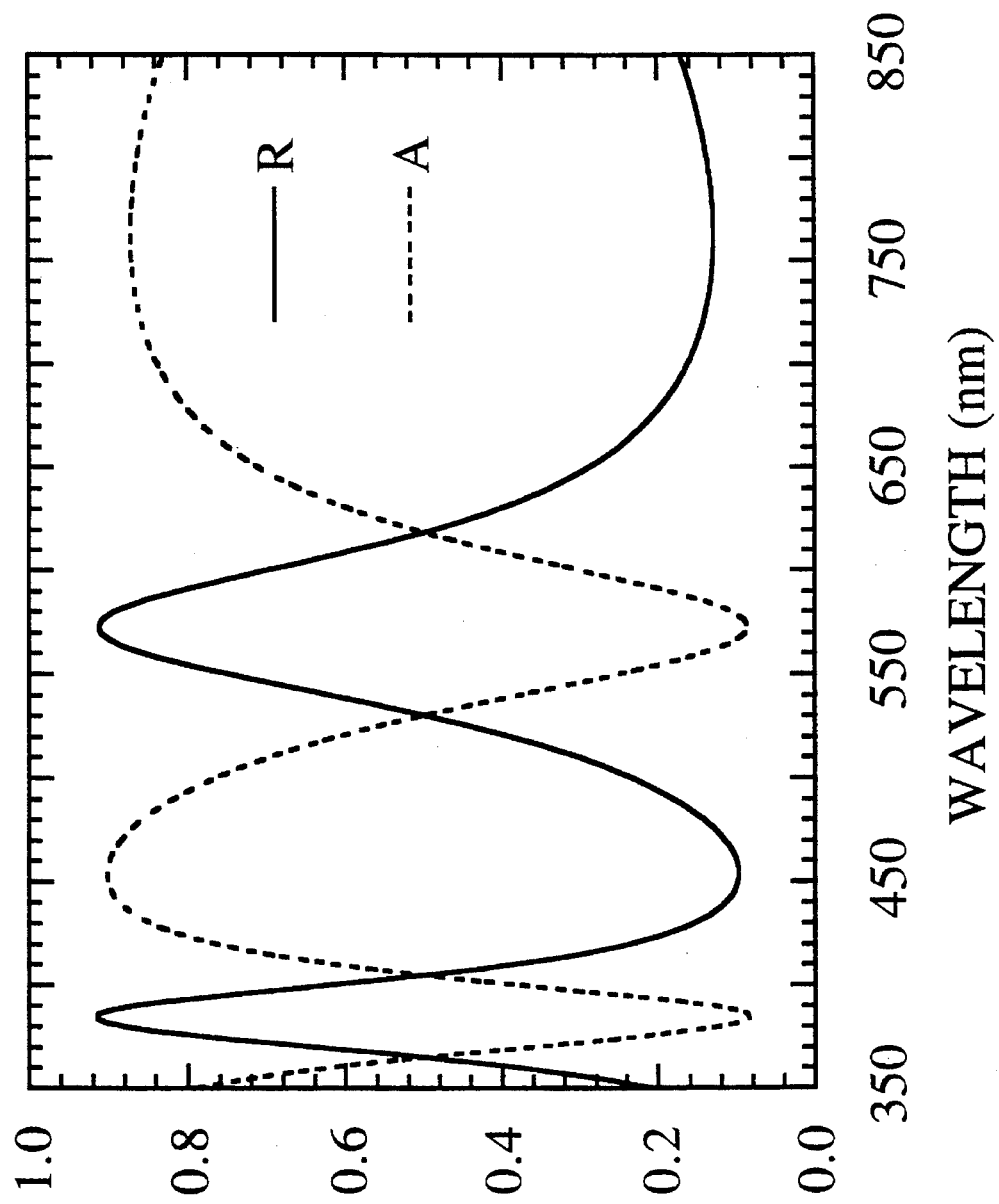
FIG. 7 is a graph showing the reflectance and absorptance curves of example A3 at normal incidence.

The reflectance and absorptance at laser wavelength are controlled by adjusting the thickness of the recording layer and the thickness of the spacer layer. When the thickness of the recording layer changes from 5 nm (in example A1) to 8.52 nm (in example A2) and to 10.2 nm (in example A3), the corresponding reflectance changes from 1.4% to 9.0% and 13.7% respectively and so does the corresponding absorptance (from 98.6% to 91.0% and to 86.3%) (FIGS. 5, 6 and 7). Because the spacer layer is transparent, therefore the high absorptance is entirely due to absorption within the recording layer. If a laser beam is used to write information, the laser energy will be absorbed sufficiently by the Inconel recording layer and the recording layer can be ablated effectively. The absorptance level at the laser wavelength is chosen to accommodate different laser powers or different lasers and to match a recording material having different heat diffusivity and heat capacity.

Figure 8:
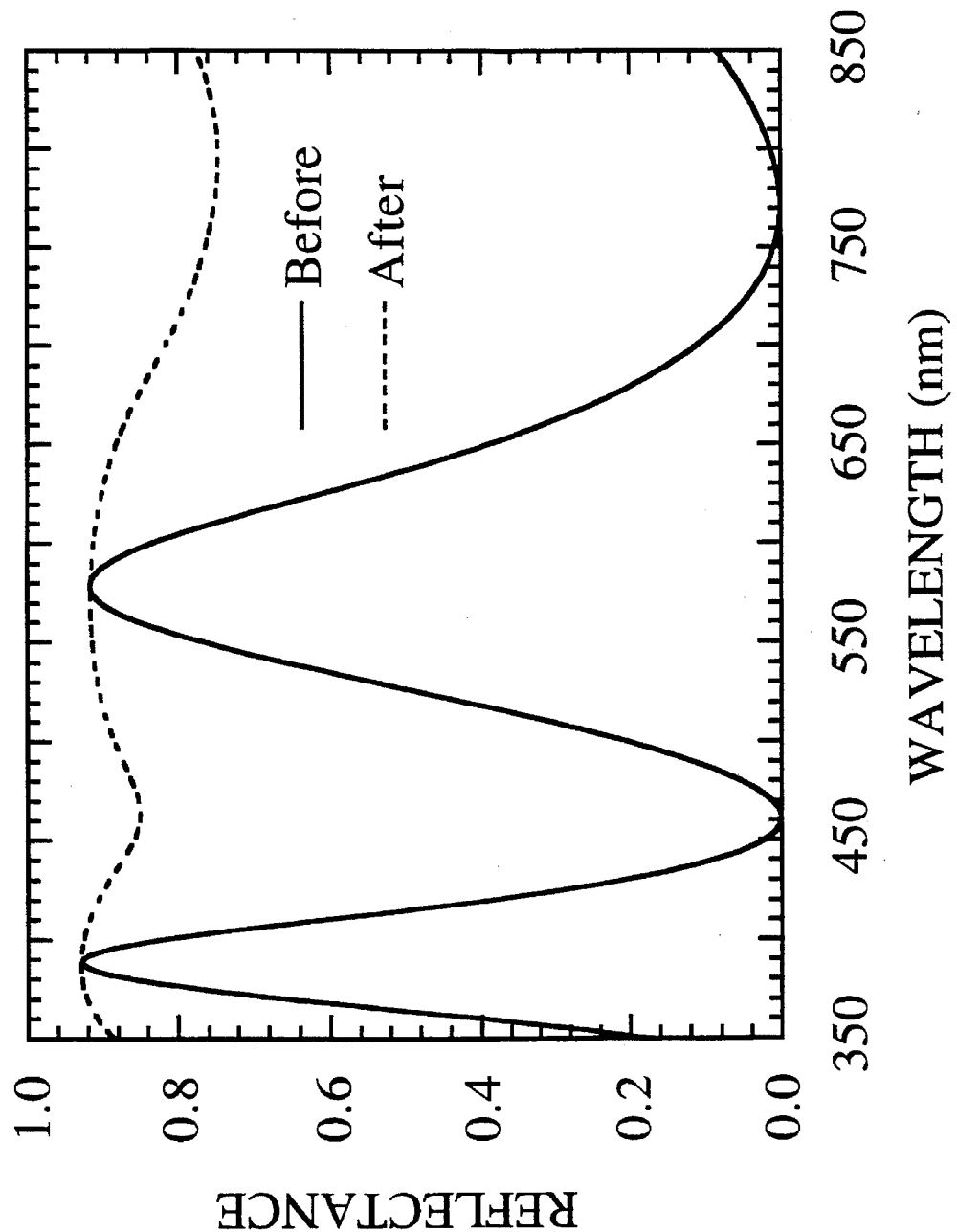
FIG. 8 is a graph showing the reflectance curves of example A1 at normal incidence before and after the recording layer is removed.
Figure 9:
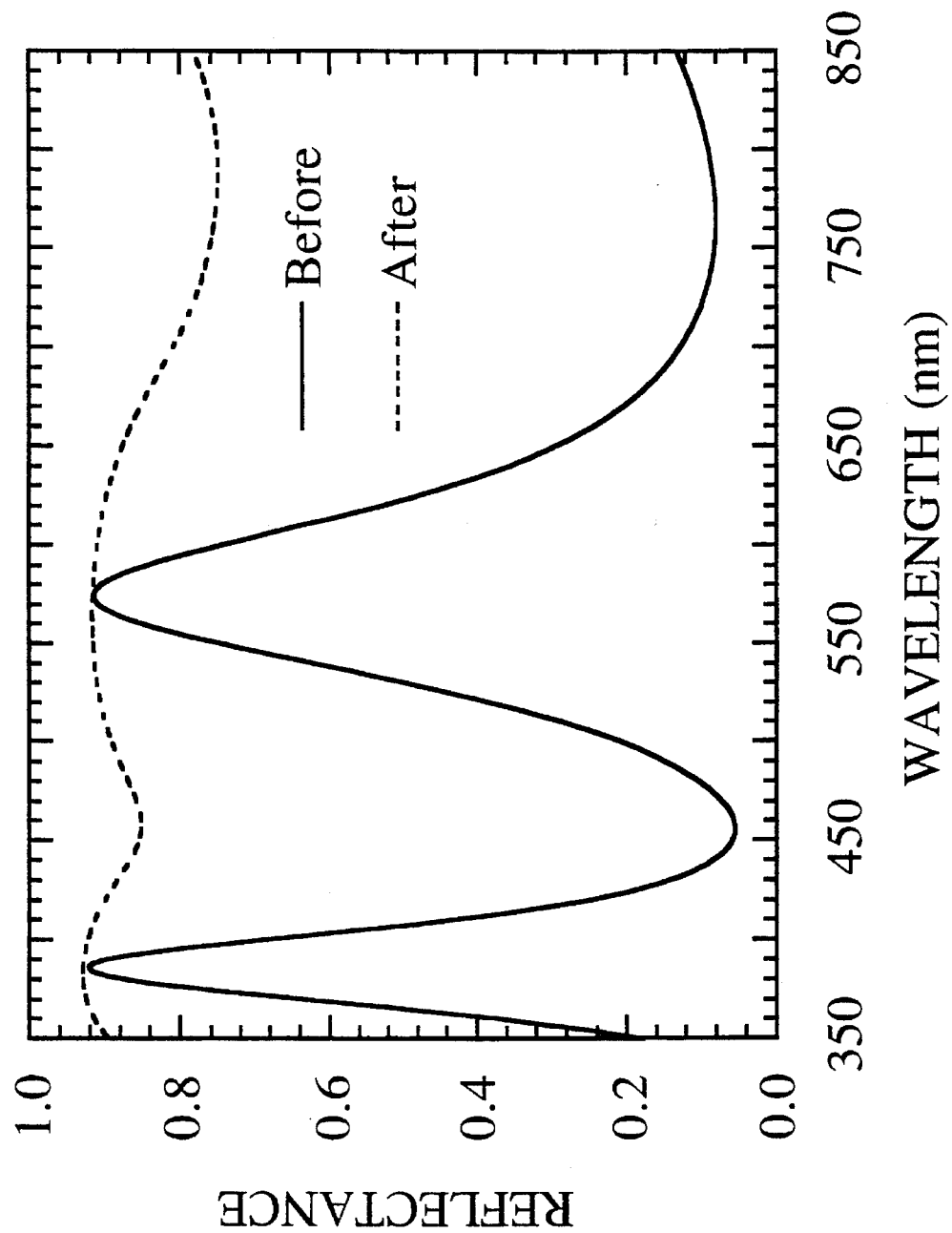
FIG. 9 is a graph showing the reflectance curves of example A2 at normal incidence before and after the recording layer is removed.
Figure 10:
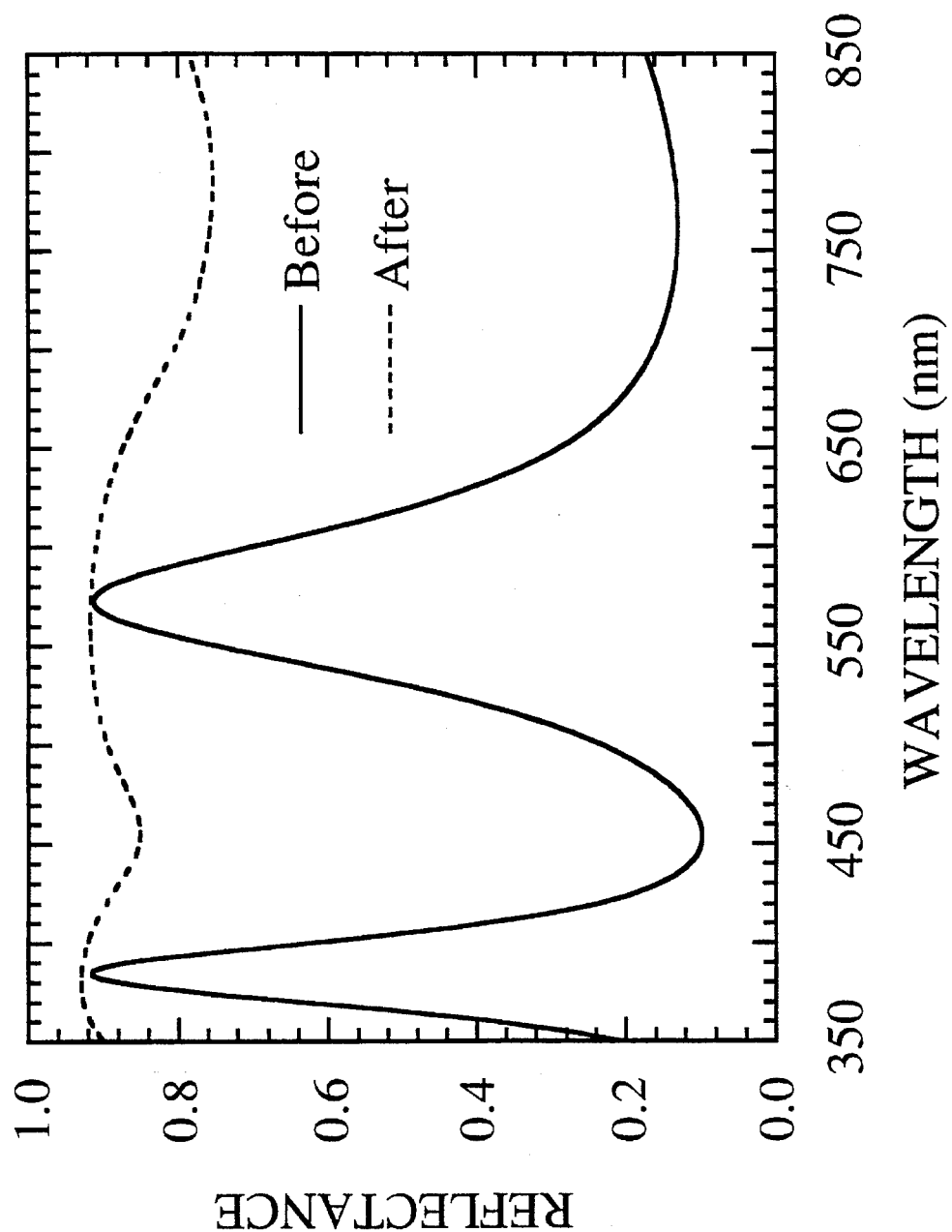
FIG. 10 is a graph showing the reflectance curves of example A3 at normal incidence before and after the recording layer is removed.

The spectral reflectance curves of examples A1, A2 and A3 at normal incidence before and after the recording layer is removed (either by photolithographic means or by laser ablation) is shown in FIGS. 8, 9 and 10. The reflectance of all three examples changes from their starting values to about 75%. Clearly, example A1 observes a very high "1" to "0" ratio (about 53.3) because of its low "0" reflectance. If a laser beam is used both for tracking and for reading or writing information, a relatively high "0" reflectance would be required. Examples A2 and A3 having a "0" reflection of 9.0% and 13.7% are designed for this purpose. Their "1" to "0" ratios are 8.3 and 5.5 respectively and are still very good for using in an ordinary optical recording system.

Figure 11:
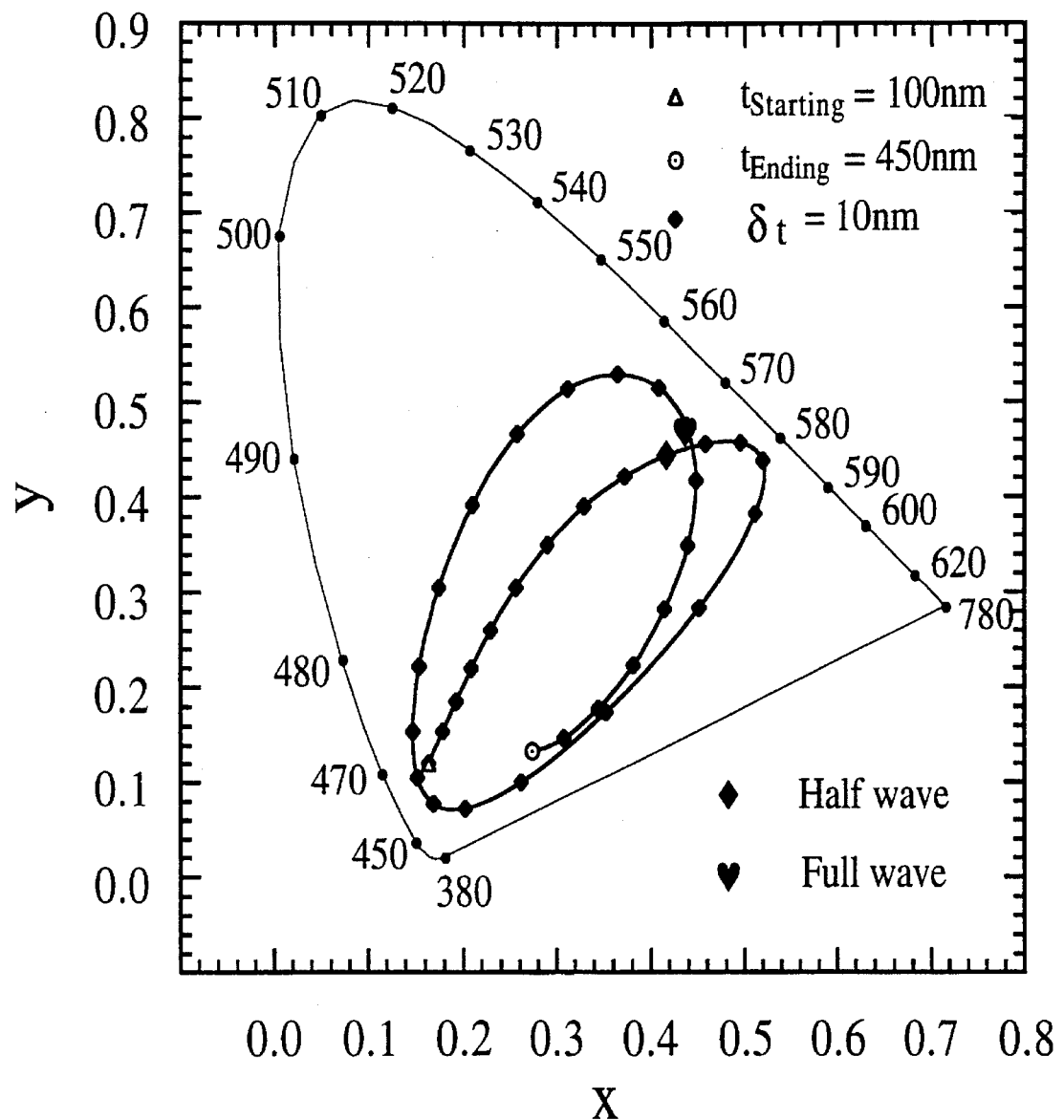
FIG. 11 is a graph showing variation of the CIE coordinates with the thickness of the spacer layer in example A1 from 100 nm to 450 nm at 10 nm intervals.
Figure 12:
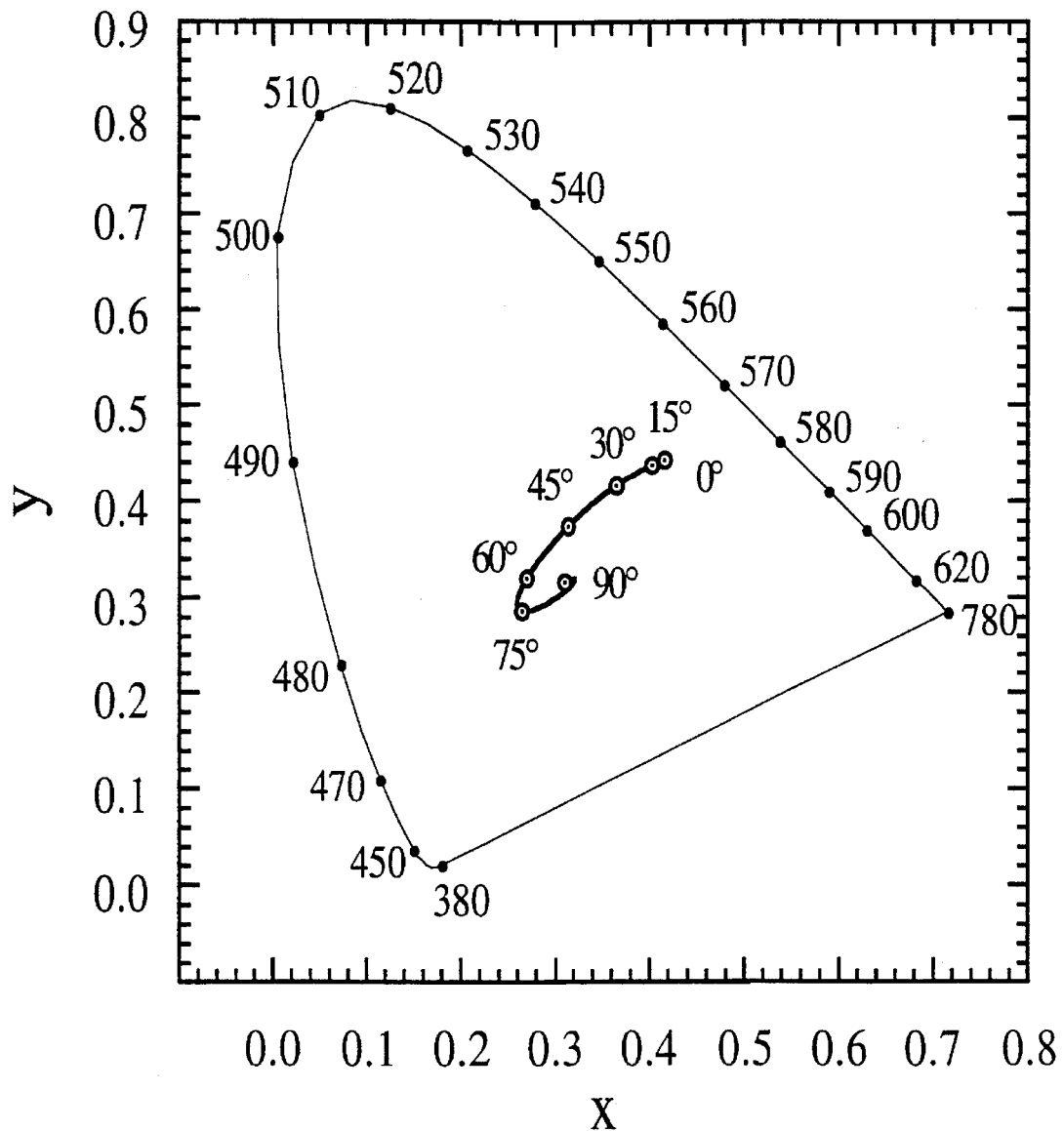
FIG. 12 is a graph that shows the variation of the CIE coordinates with angle of incidence for an example similar to example A1 but having a half spacer thickness.

FIG. 11 shows the color CIE coordinates of example A1 at normal incidence changing with the thickness of the spacer layer from 100 rim to 450 nm at 10 nm interval. Clearly, the perceived color is very sensitive to the thickness of the spacer layer. FIG. 11 also shows that there are two thicknesses which result in a similar color at normal incidence. They correspond to a half-wave and a full wave (in the case of example A1) thicknesses at the peak reflectance wavelength (525 nm). However the color corresponding to a half-wave thickness changes very little with angle of incidence as shown in FIG. 12. This is generally true when a thinner spacer layer is applied. Therefore, although a similar structure and same materials are applied, if the thickness of the spacer layer is not correct, a color change effect will not be observed.

Figure 13:
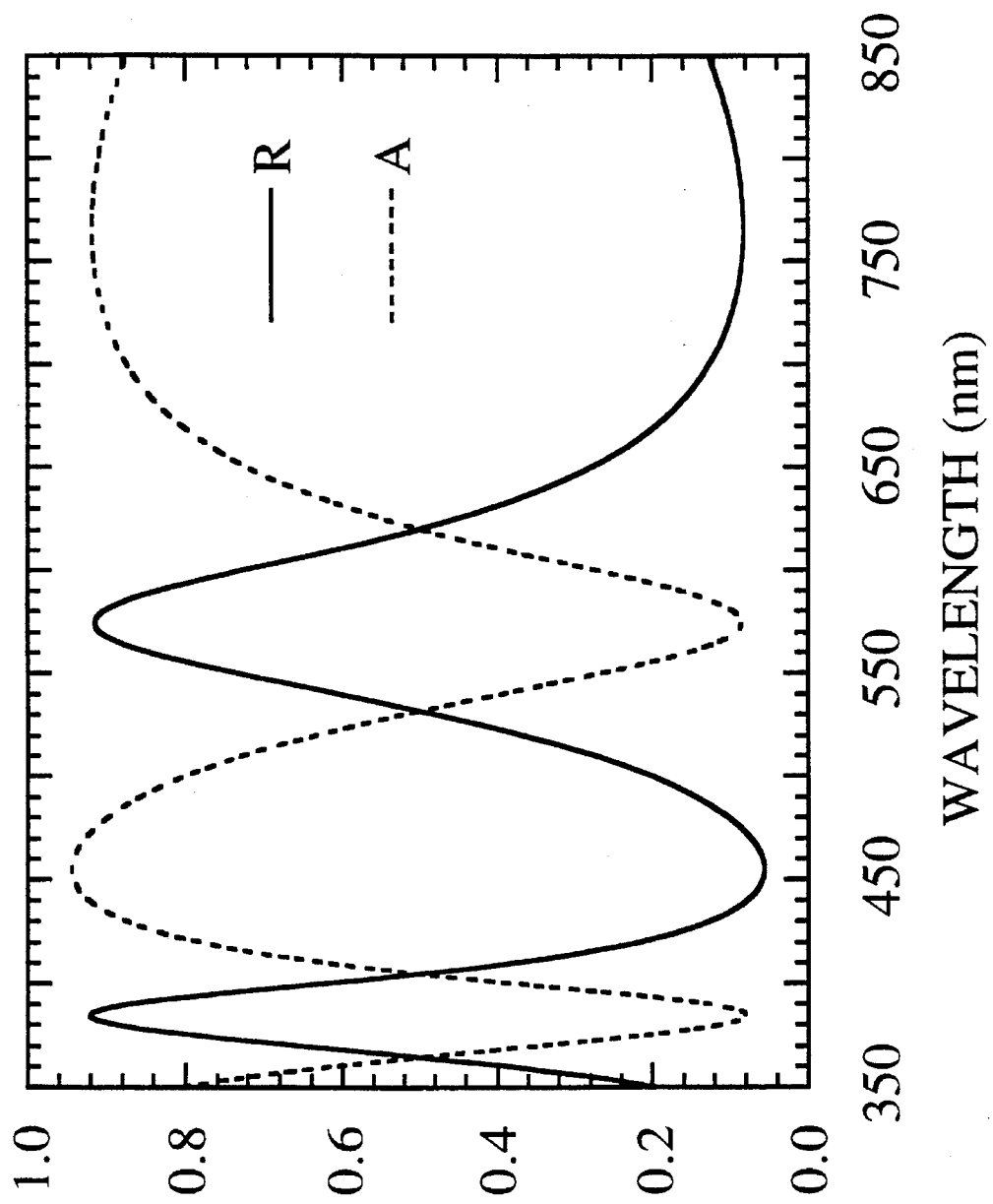
FIG. 13 is a graph showing the reflectance and absorptance curves at normal incidence of example A4 as defined in Table I.
Figure 14:
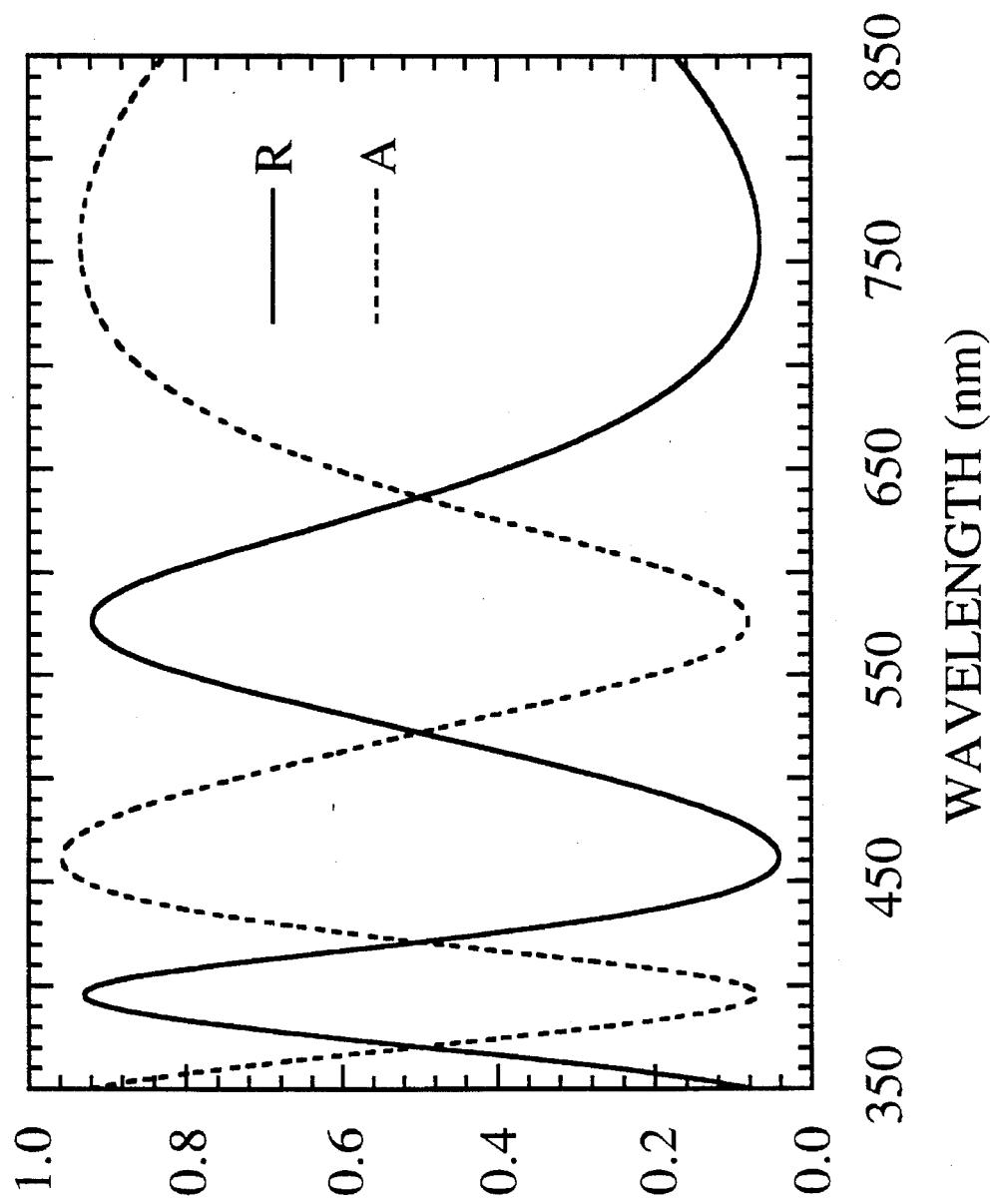
FIG. 14 is a graph showing the reflectance and absorptance curves at normal incidence of example A5 as defined in Table I.
Figure 15:
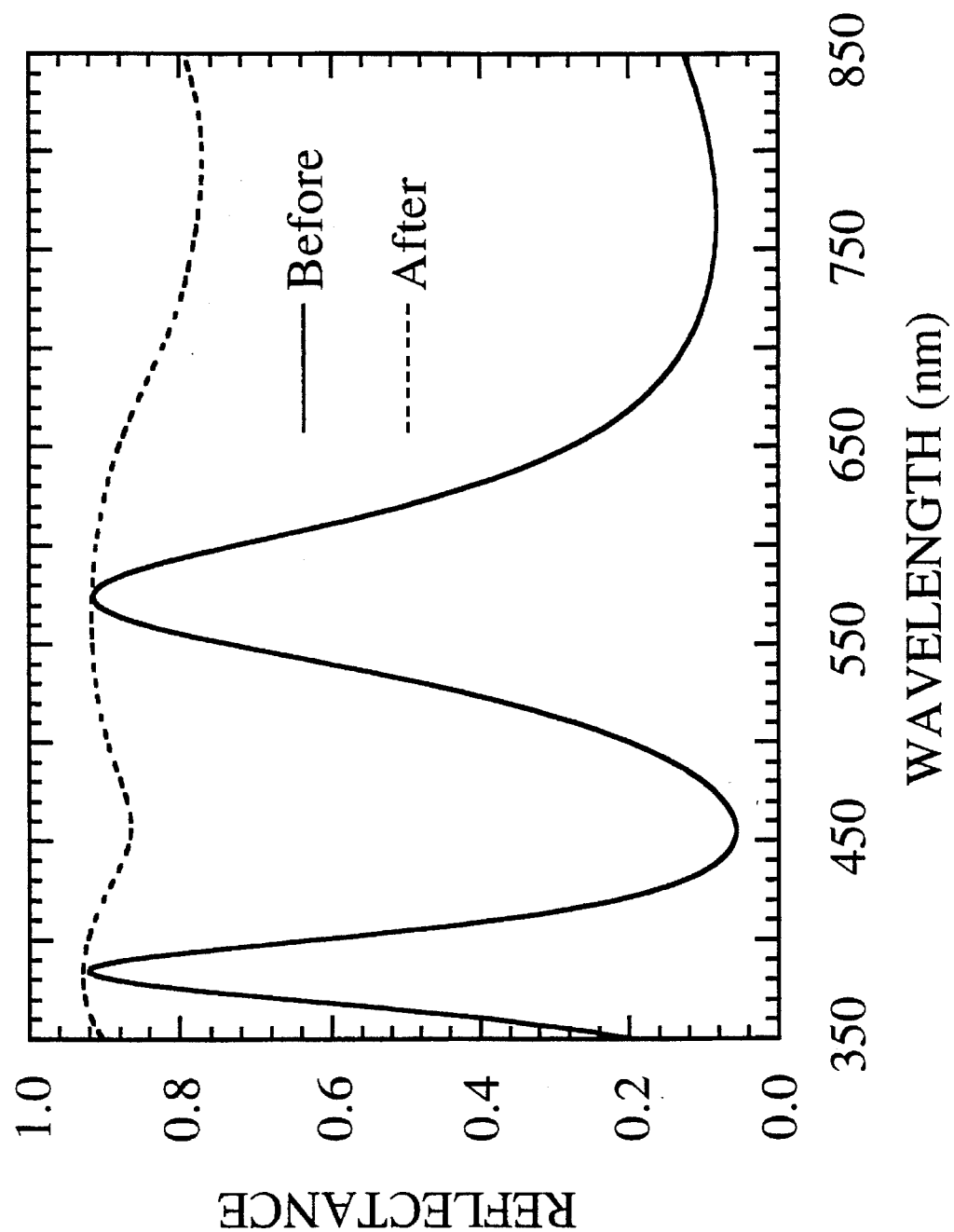
FIG. 15 is a graph showing the reflectance curves of example A4 at normal incidence before and after the recording layer is removed.
Figure 16:
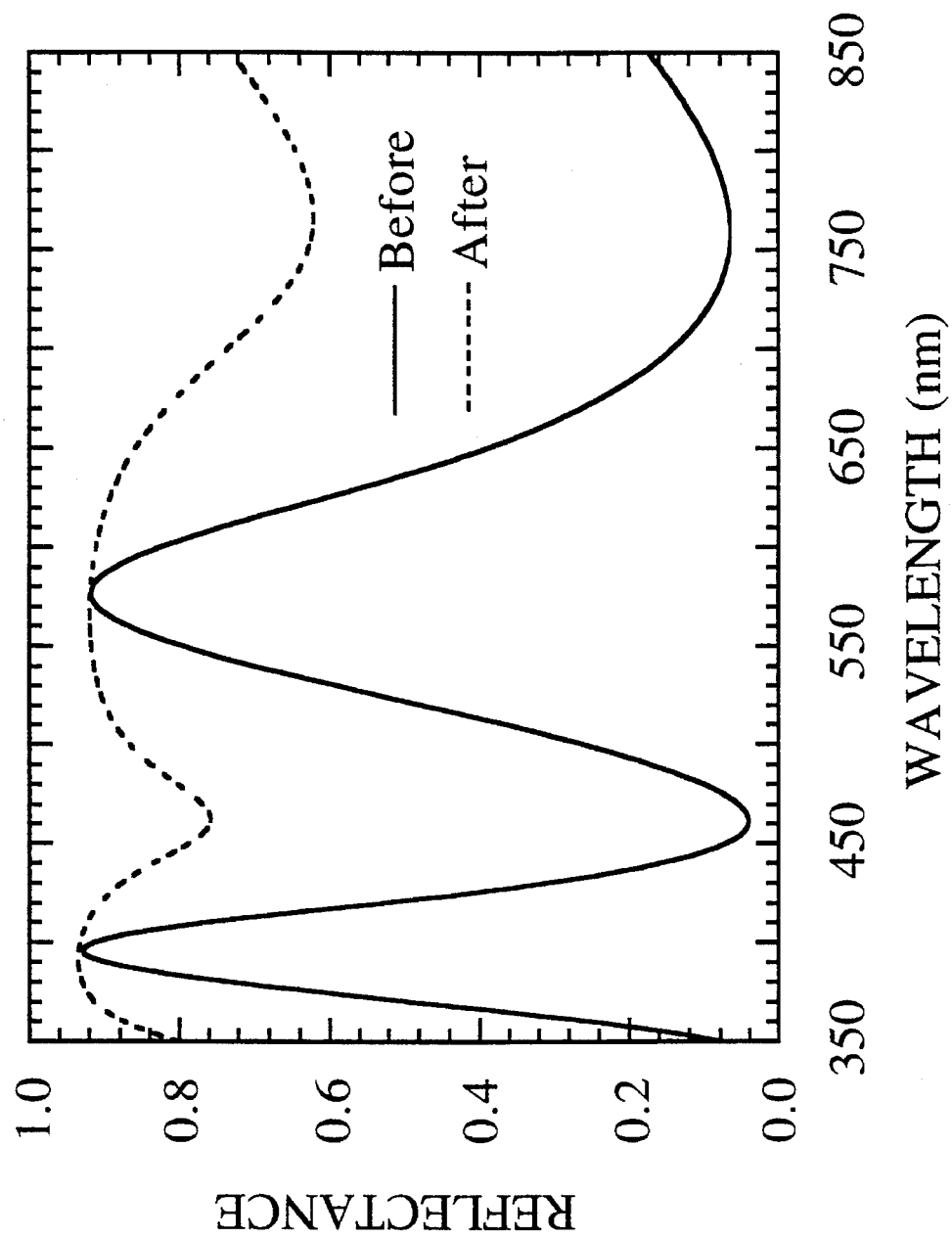
FIG. 16 is a graph showing the reflectance curves of example A5 at normal incidence before and after the recording layer is removed.
Figure 17:
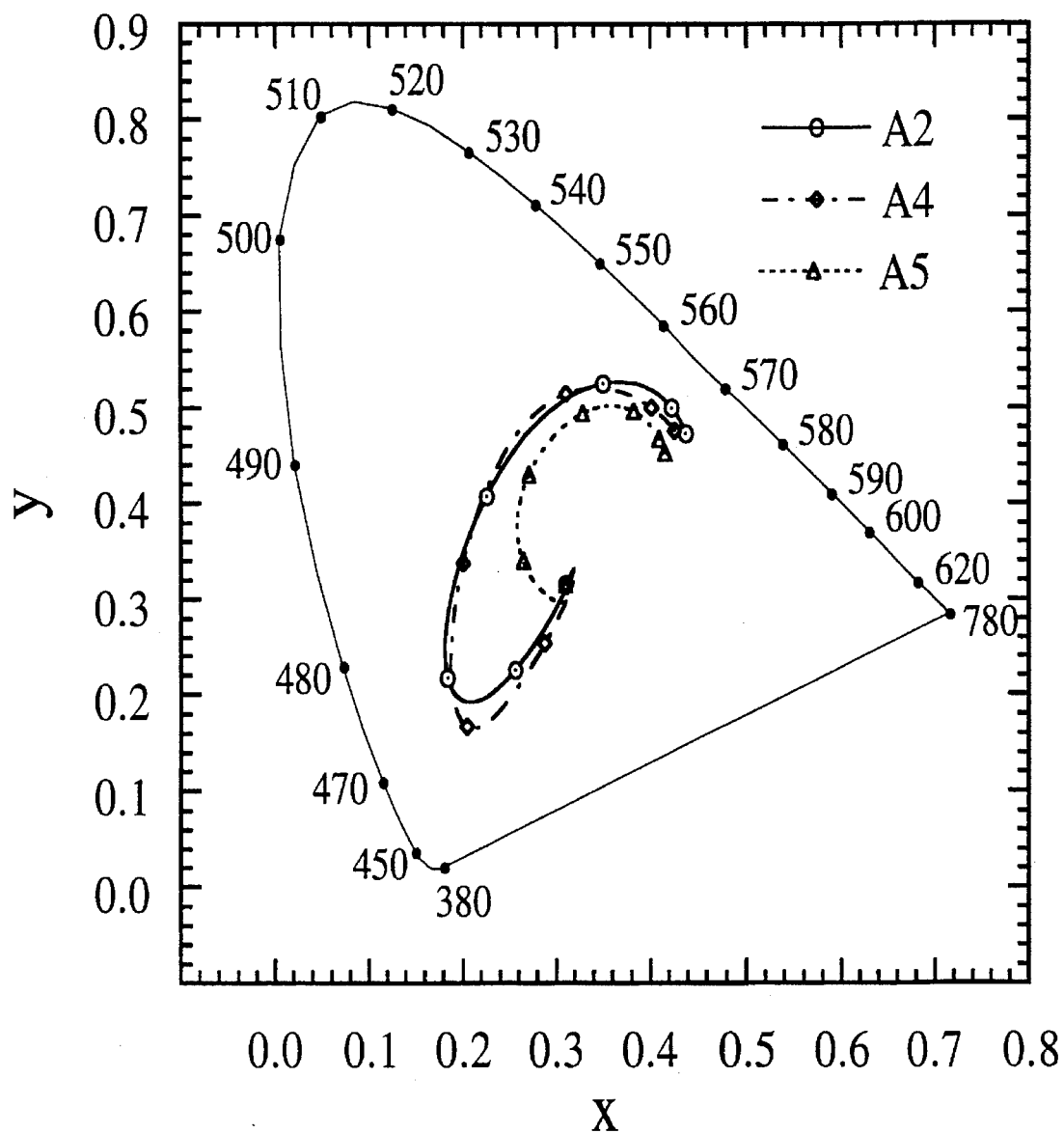
FIG. 17 is a graph that shows the variation of the CIE coordinates of examples A2, A4 and A5 with the incident angle increasing at 15° intervals.

Examples A4 and A5 have a similar Inconel thickness as example A2 but have a different spacer layer made of lower and higher refractive index materials of $MgF_2$ and $ZrO_2$. The reflectance and absorptance curves of examples A4 and A5 at normal incidence are shown in FIGS. 13 and 14. The reflectance curves before and after the recording layer being removed are shown in FIGS. 15 and 16. Clearly, the recording performance of examples A2, A4 and A5 are similar as summarized in Table I. FIG. 17 shows the CIE coordinates of examples A2, A4 and A5 changing with the incidence angle increasing at 15° intervals. Although examples A2, A4 and A5 have a similar greenish-yellow color at normal incidence, obviously example A4 has the largest color change due to its lowest refractive index spacer layer and example A5 has the smallest color change. Once again, when the structure is similar but the layer is made of a different of material, a different color change characteristic will be observed.

One example B1 is designed for a phase change recording medium having optically variable security properties. Example B1 consists of a glass substrate, an opaque aluminum reflector having a thickness≧25 nm, a $SiO_2$ spacer layer, a TeOx recording layer and a $SiO_2$ protective layer. The TeOx layer has two stable crystalline phases which can be restored by heating and annealing with a laser beam. The refractive indexes corresponding to the two phases are $3.1-i1.2$ and $3.9-i1.6$ respectively. The parameters of the structure and the color and recording performance of example B1 are shown in Table II.

Figure 18:
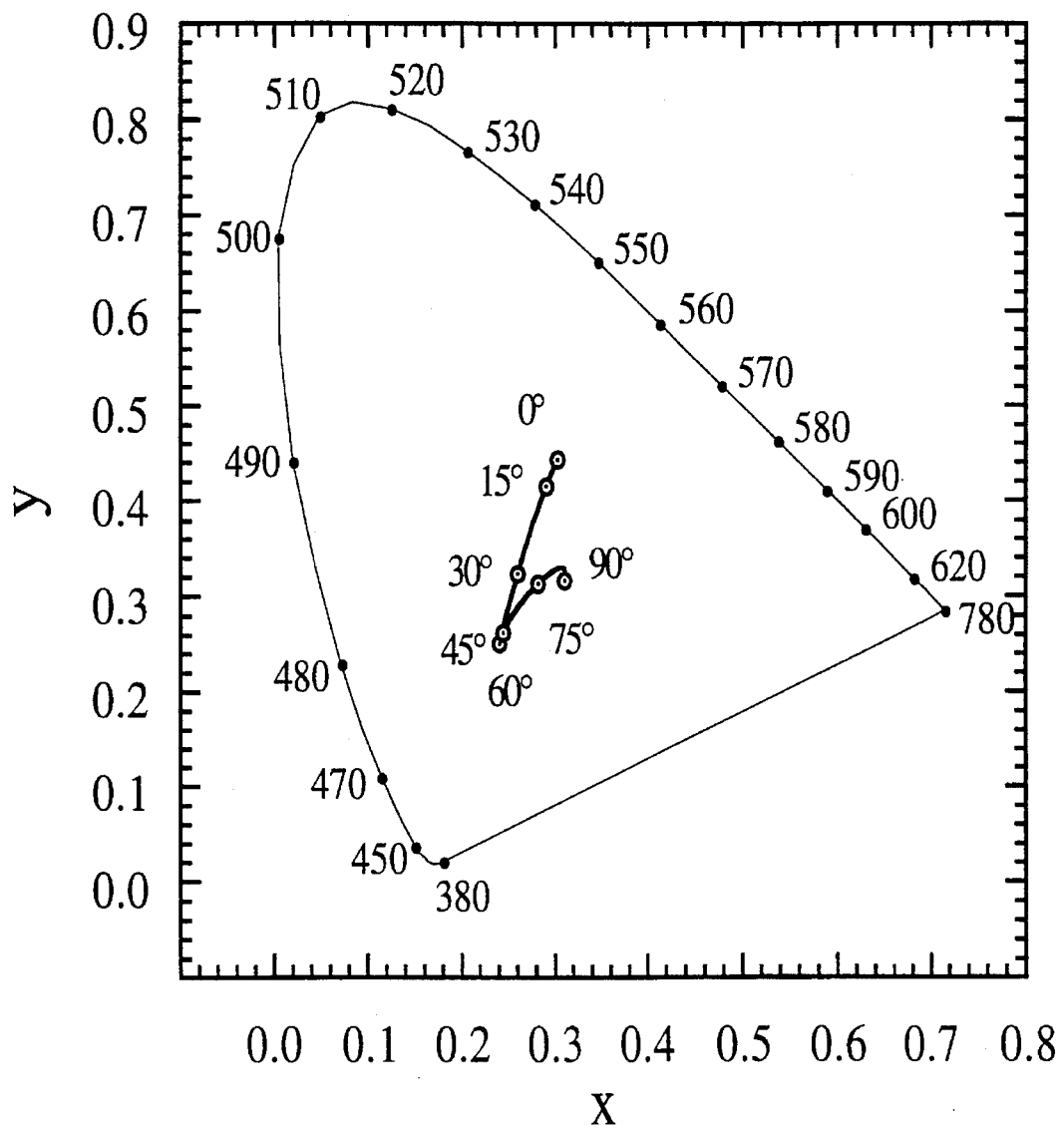
FIG. 18 is a graph which shows the variation of CIE coordinates with angle of incidence of example B1 as defined in Table II.

FIG. 18 shows the variation of the CIE coordinates of example B1 with angle of incidence. The color changes from yellowish green at normal incidence, to white at 45°, and to white at 75°.

Figure 19:
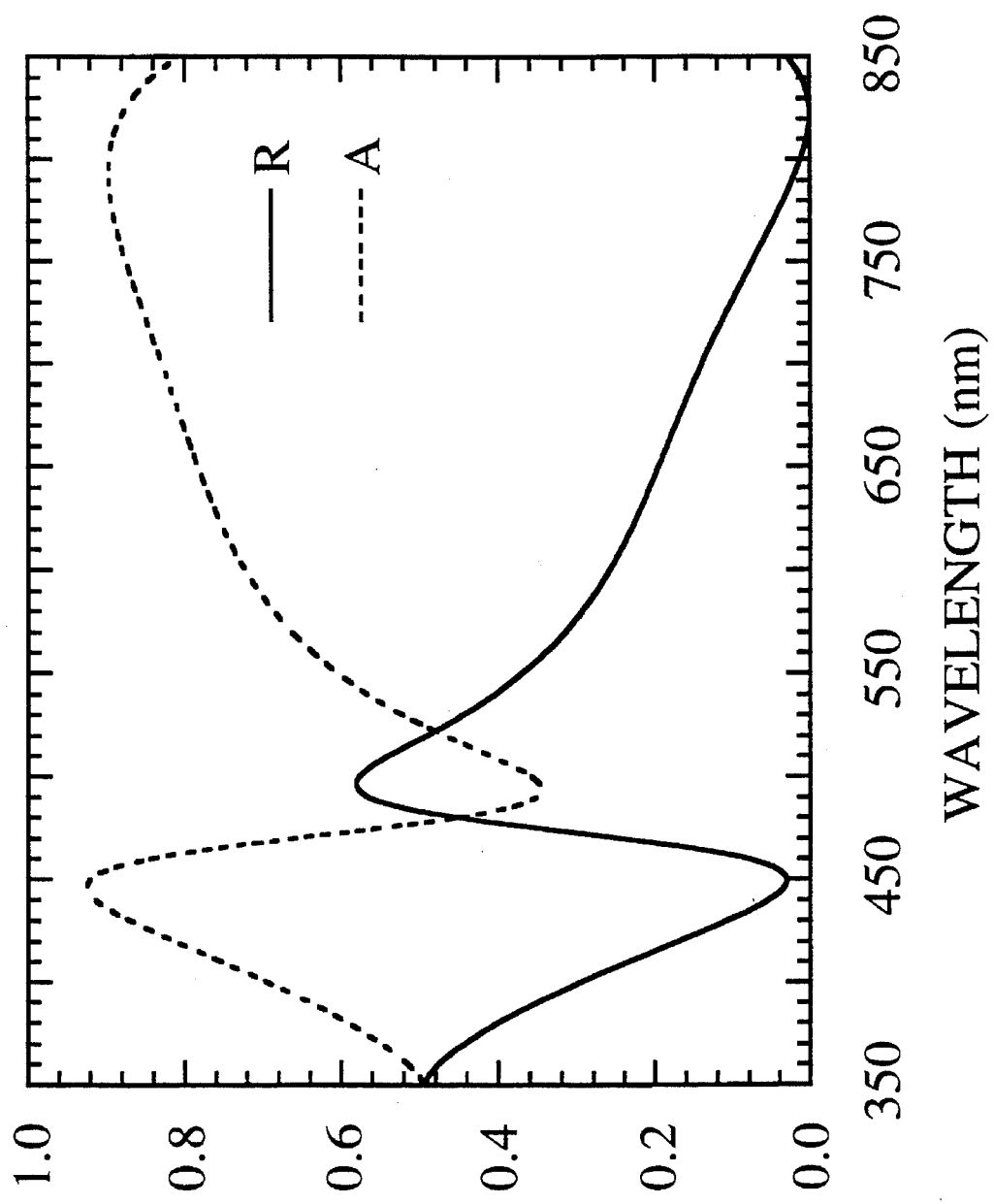
FIG. 19 is a graph showing the reflectance and absorptance curves of example B1 at normal incidence.

FIG. 19 shows the reflectance and absorptance curves of example B1 at normal incidence. The absorptance at the laser wavelength 800 nm is 89.6%, thus the laser energy can be efficiently absorbed by the recording layer in the erasing and writing process. A lower laser power is used for reading information.

Figure 20:
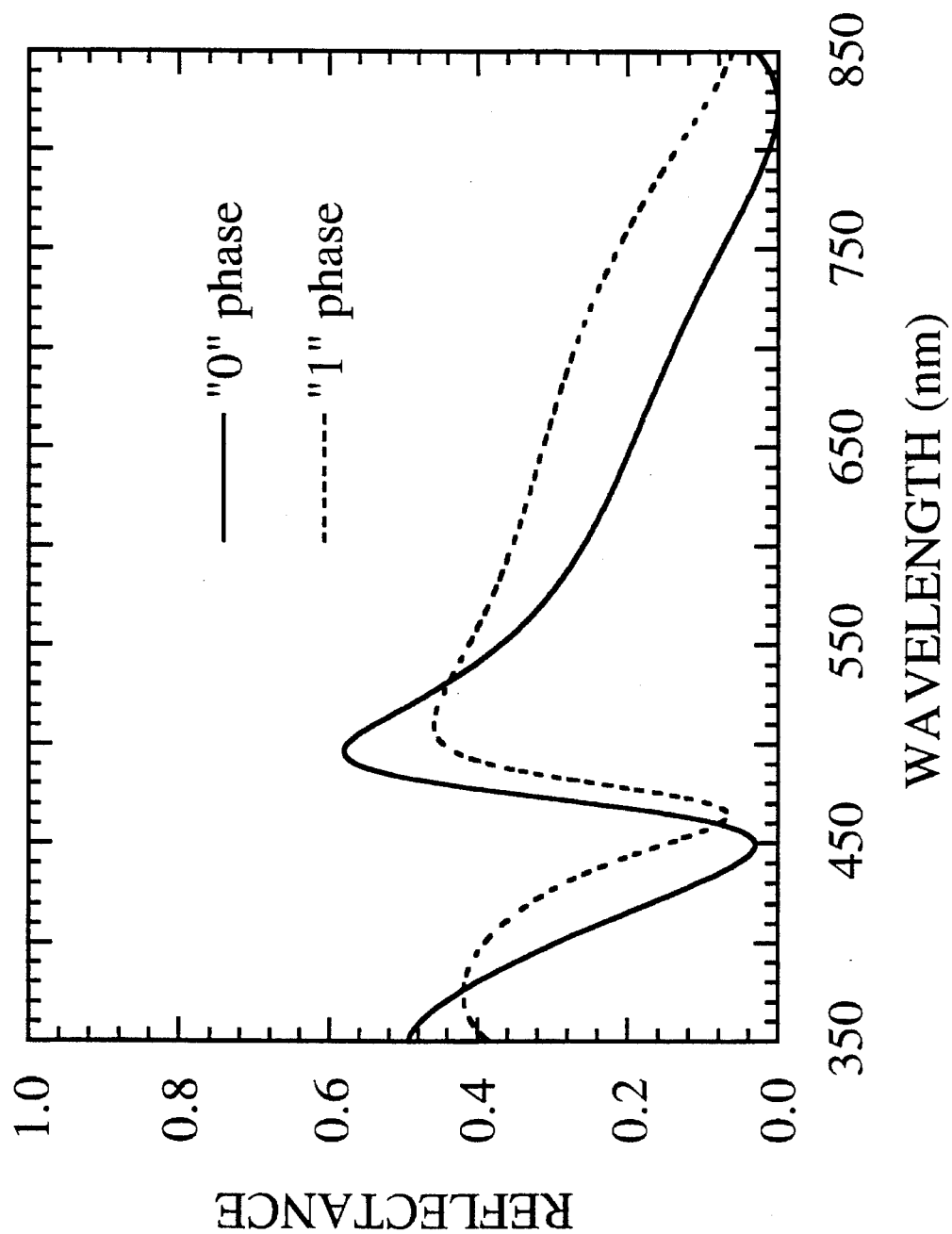

FIG. 20 shows the reflectance curves at normal incidence for two different phases. The reflectance changes from 1.3% ("0") in one phase to 13.7% ("1") in the other phase. The "1" to "0" ratio is about 10.5 which is good for this type of recording medium Two examples C1 and C2 have been designed for a magneto-optic medium. Example C1 consists of a glass substrate, an opaque aluminum reflector with a thickness≧25 nm, a $SiO_2$ spacer layer, a TbFeCo magneto-optic recording layer and a $SiO_2$ protective layer. The complex gyro-electric constant and optical constant of the TbFeCo material at 800 nm are $(0.01063+i0.02154)$ and $(2.7-i3.34)$ respectively. The "0" and "1" signals correspond to the up and down magnetic fields of the recording unit. The recording performance of a magneto-optic medium is represented by the signal to noise ratio (SNR) or the figure of merit which is defined by the product $\sqrt{R}\theta_k$, where $\theta_k$ is the Kerr rotation angle and R is the reflectance at the laser wavelength. The parameters of the structure and the color and recording performance of example C1 is shown in Table III.

FIG. 21 shows the variation of the CIE coordinates of example C1 with angle of incidence. The color changes from orange-pink at normal incidence, to yellow-green at 45° and to whitish-purple at 75°.

FIG. 22 shows the reflectance and absorptance curves of example C1 at normal incidence. The absorptance at the laser wavelength 800 nm is 89.2%. Therefore the laser energy can be efficiently absorbed by the TbFeCo recording layer in the erasing process. The Kerr rotation angle $O_k$ and the SNR of example C1 are 2.34° and $1.09 \times 10^{-2}$ which are comparable with an ordinary magneto-optic recording medium.

Example C2 uses a quarter wave stack reflector made of ZnS and $MgF_2$ materials, instead of a single layer reflector. It comprises a $MgF_2$ spacer layer, a TbFeCo recording layer and a $SiO_2$ protective layer. The parameters of the structure and the color and recording performance of example C2 is listed in Table III.

FIG. 23 shows the variation of the CIE coordinates of example C2 with angle of incidence. The color changes from yellow-green at normal incidence, to whitish-purplish pink at 45° and to white at 75°.

FIG. 24 shows the reflectance and absorptance curves of example C2 at normal incidence. The absorptance at the laser wavelength is about 84.8%. The Kerr rotation angle $\theta_k$ and the SNR are 2.29° and $1.1 \times 10^{-2}$.

The optical media shown above having optically-variable security features are designed for a laser operating at 800 nm. However, the examples also have a similar recording performance at the wavelength of 440 nm. Hence they can work equally well with a laser operating at 440 nm. This results in approximately a 90% increase in data density.

4. Operation of optical recording media with optically-variable security properties FIG. 25 shows an optical recording system employing an optical recording medium with optically-variable security properties in accordance with the invention. The medium is in the form of a disk, card or a tape, or may be attached to an article to be protected. The authentication of the medium is first verified by a visual examining the color of the medium at different viewing angles or by a special device designed for this purpose which is not shown here. A further examination is carried out by checking the information encoded on the optical recording medium. This will be explained in detail in the next few paragraphs. The optical recording system comprises a light source 20 providing light for reading and writing information; a collector lens 21 for collimating the light; a polarizing beam splitter 22 for polarizing and splitting the light; a prism mirror 23 for turning the light; a quarterwave plate 24 for producing a 90° rotation of polarization; an optical recording medium 26 having decodable data and optically-variably security properties in accordance with the invention; a magnetic head 27 for providing a bias magnet and writing information (for magneto-optic media only); an analyzer 28 for producing polarized light (for magneto-optic media only); a toric lens 29; and a detector 30 for detecting and decoding information. The quarterwave plate 24 in conjunction with the polarizing beam splitter 22 provides an optical isolator for the light source 20.

Figure 26A:
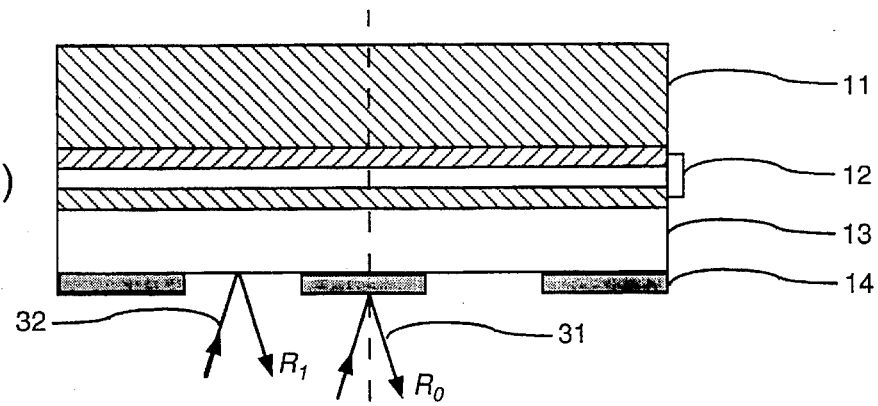

The recording medium 26 shown within marked area in dotted line in FIG. 25 is enlarged (not in dotted line) in FIG. 26(a) and (b), and (c) for different types of recording media. FIG. 26(a) shows a read-only or write-once optical recording medium 26 having optically-variable security properties. For a read-only medium, information such as bar codes and digital data is pre-coded by photographic means and is unchangeable. For a write-once medium, the information is stored by marking the recording layer with the focused laser 20 operating at a higher power level. The formation of the recorded marks is an irreversible thermal response to the laser energy absorbed by the recording layer, which includes local melting, vaporization or ablation, deformation and compositional changes in the recording layer. Therefore, after the information is written, it is not changeable. The information is retrieved by using a lower laser power. The reflectances $R_0$ (31) and $R_1$ (32), corresponding to the areas where the recording layer 14 is unmarked("0") and marked ("1"), are detected by the detector 30 and then checked by an electric system which is similar to systems known in prior arts and hence is not shown here.

Figure 26B:
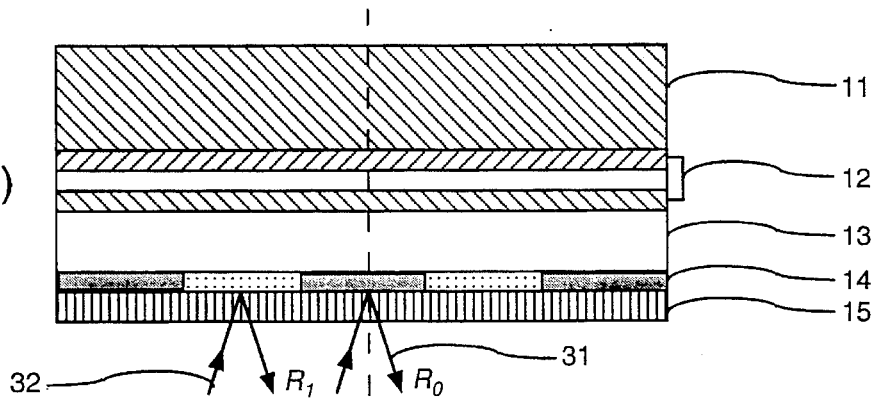

FIG. 26(b) shows a phase change recording medium 26 with optically-variable security feature. The recording layer 14 is made of a material having two crystalline phases. The information is recorded by changing the phase of the recording layer 14 with a higher laser power. The two phases have different microstructures and hence different optical constants, resulting in a difference in reflectance. $R_0$ (31) and $R_1$ (32) are the reflectances corresponding to the areas where the recording layer 14 is unmarked ("0") and marked ("1"). They are detected by the detector 30 and then checked by an electric system which is similar to prior arts and hence is not shown here. Often the recording layer 14 can be switched from one metastable phase to another by appropriate thermal conditioning using the laser beam. Therefore the information can be erased and written again.

Figure 26C:
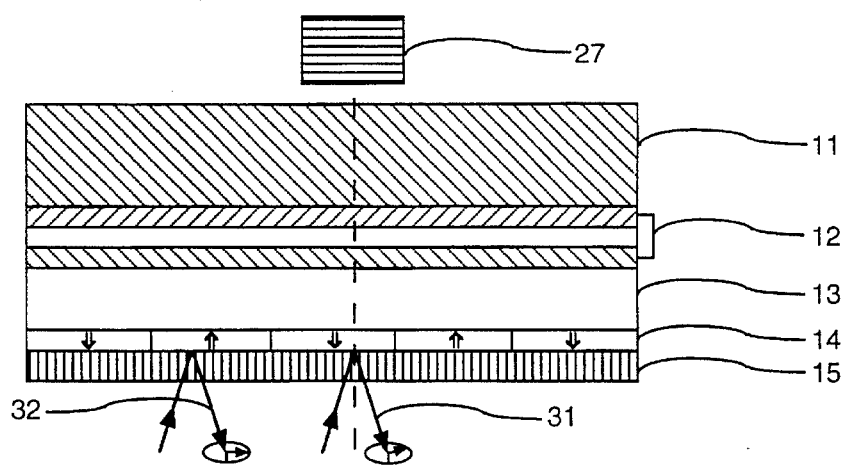

FIG. 26(c) shows a magneto-optic recording medium 26 having optically-variable security properties. The recording layer 14 is made of a magneto-optic material. The up and down magnetic states (indicated by arrows) correspond to "0" and "1" data-bits respectively. The information is encoded by using a higher laser power. The laser energy is absorbed by the recording layer 14 and causes the temperature to rise locally. Once the temperature exceeds the Curie point of the material, the unit loses its magnetic property and the stored information is erased. As the temperature cools down, a magnetic bias from the magnetic head 27 is used to input the magnetic state of the unit corresponding to a "0" or "1" data-bit. The information is decoded by a polarized light. When the polarized light beam from the light source 20 reflects back from the magnetic medium, the plane of polarization of the light is rotated. The rotation direction depends on the magnetic state of the recording unit as shown in FIG. 26 (31 and 32). The analyzer 28 and the detector 30 are used to measure the rotated light. A difference is observed between the up ("0") and down ("1") magnetic states. The information is then checked by an electric system which is similar to prior arts and hence is not shown here.

5. Summary

In summary, the new thin film structures in accordance with the invention have both color change and optical recording properties. Therefore the new thin film structure can be used as a secured optical recording medium in the area where ordinary optical recording media are currently used, such as CD ROMs and optical disks. As well a flexible substrate may be used; for example, the invention may be in the form of optical recording tape having variable optical properties. Information encoded onto the thin film structure, such as bar codes and digital data decodable by optical recording means, make it very effective and secure for anticounterfeiting purposes. It, therefore, can be used as an enhanced thin film security device and applied to currencies, passports, cheques and other articles. More importantly, they can be used on credit cards and bank cards fix storing information as well as providing a security measure against counterlimiting.

The above examples are designed for a laser operating at 800 nm and using specific materials, however, numerous other embodiments of the invention using other materials and for other laser wavelengths may be realized without departing from the spirit and scope of the invention.

Well known techniques such as chemical deposition, physical evaporation, sputtering, and ion plating can be used for the fabrication of the above media.

TABLE I

Examples for Read-only and Write-once Media

| | | A1 | | A2 | A3 | A4 | | A5 | |
|---|---|---|---|---|---|---|---|---|---|
| | Layer | Material | Thickness (nm) | Thickness (nm) | Thickness (nm) | Material | Thickness (nm) | Material | Thickness (nm) |
| System | Sub. | Glass | — | — | — | Glass | — | Glass | — |
| | 1 | Al | ≧25.00 | ≧25.00 | ≧25.00 | Al | ≧25.00 | Al | ≧25.00 |
| | 2 | $SiO_2$ | 380.32 | 375.66 | 373.45 | $MgF_2$ | 398.63 | $ZrO_2$ | 279.44 |
| | 3 | Inconel | 5.00 | 8.52 | 10.19 | Inconel | 8.63 | Inconel | 7.82 |
| | Med. | Air | — | — | — | Air | — | Air | — |
| Color Performance | CIE Coordinates at 0° | x = 0.438 y = 0.473 L = 0.652 | | x = 0.425 y = 0.475 L = 0.620 | x = 0.410 y = 0.463 L = 0.615 | x = 0.426 y = 0.476 L = 0.607 | | x = 0.415 y = 0.453 L = 0.675 | |
| | Color | Greenish yellow | | Greenish yellow | Greenish Yellow | Greenish yellow | | Greenish yellow | |
| | CIE Coordinates at 45° | x = 0.225 y = 0.407 L = 0.525 | | x = 0.220 y = 0.393 L = 0.459 | x = 0.226 y = 0.381 L = 0.449 | x = 0.200 y = 0.338 L = 0.390 | | x = 0.328 y = 0.494 L = 0.679 | |
| | Color | Green | | Green | Green | Blue green | | Whitish-bluish green | |
| Recording Performance at 800 nm | Absorptance | 0.986 | | 0.910 | 0.863 | 0.910 | | 0.909 | |
| | Reflectance at "0" | 0.014 | | 0.090 | 0.137 | 0.090 | | 0.091 | |
| | Reflectance at "1" | 0.747 | | 0.752 | 0.754 | 0.771 | | 0.645 | |
| | "1" to "0" ratio | 53.3 | | 8.3 | 5.5 | 8.6 | | 7.1 | |

7. A thin film structure as defined in claim 4, wherein the recording layer is encoded by one of the processes consisting of photolithographic means, local melting, vaporization, ablation, deformation and structural change with a laser beam.

What I claim is:

1. A thin film structure for storing data and having optically-variable properties for the prevention of counterfeiting and forgery, comprising:
a substrate having data encoded therein;
a thin film multilayer interference coating defining a Fabry Perot structure carried by the substrate, the interference coating being of a thickness suitable for providing thin film interference effects such that colours seen vary with a change in viewing angle, said thin film multilayer interference coating including at least one semi-transparent layer, at least a non-absorbing spacer including one or more dielectric layers, and a reflecting layer, the at least one spacer being disposed between the at least one semi-transparent layer and the reflecting layer.

2. A thin film structure as defined in claim 1 wherein the nonabsorbing dielectric layer is made of a transparent material selected from $Al_2O_3$, $HfO_2$, $MgF_2$, $Nb_2O_5$, $SiO_2$, $Ta_2O_5$, $TiO_2$, $Y_2O_3$, ZnS, ZnSe, and $ZrO_2$.

3. A thin film structure for storing data as is defined in claim 2, wherein the nonabsorbing dielectric layer is between 10 nm and 100 nm in thickness.

4. A thin film structure as defined in claim 1 wherein a recording layer is carried by the thin film multilayer interference coating and is positioned to receive and absorb an external light signal.

5. A thin film structure as defined in claim 4 wherein the optically decodable data is one of the forms comprising bar codes and digital data.

6. A thin film structure as defined in claim 4 wherein the at least one semi-transparent layer is a light absorbing material selected from the group consisting of Al, Cr, Co, Cu, Ge, Au, Hf, Mo, Ni, Nb, Pt, Si, Ag, Ta, Te, Ti, W, Yr, Zr, $TeO_x$, organic dyes or Ni based alloys.

8. A thin film structure for storing data and having optically-variable properties, for the prevention of counterfeiting and forgery, comprising:
a substrate; and,
a thin film multilayer interference coating defining a Fabry Perot structure carried by the substrate for recording optical decodable data, the interference coating being of a thickness suitable for providing thin film interference effects such that colours seen vary with a change in viewing angle, the thin film multilayer interference coating including at least a recording layer made of a phase changing material for storing information, and a plurality of adjacent layers including a nonabsorbing dielectric layer and at least another layer of another material that is selected from the group consisting of metals, dielectrics, and semiconductors, the nonabsorbing layer being a spacer layer disposed between the recording layer and the at least other layer.

9. A structure as defined in claim 8 wherein the recording 8 wherein the recording layer is positioned to receive and absorb an external light signal.

10. A structure as defined in claim 9 wherein a crystalline microstructural phase of the phase change material of the recording layer changes when energy provided by the external light signal is absorbed by the material.

11. A structure as defined in claim 8 wherein the optically decodable data is encoded in the recording layer by heating the layer to a sufficient temperature to change the phase of the material with a laser beam.

12. A thin film structure for storing data and having optically-variable properties, for the prevention of counterfeiting and forgery, comprising:
a substrate; and,
a thin film multilayer interference coating carried by the substrate for recording optical decodable data, said interference coating being of a thickness suitable for providing thin film interference effects such that colours seen vary with a change of viewing angle, the thin film multilayer interference coating defining a Fabry Perot structure including at least a transparent dielectric layer and a reflective layer of another material that is selected from the group consisting of metals, dielectrics, and semiconductors the interference coating also including a recording layer, the recording layer being a magnetic-optic material for storing magnetic-optically decodable data, the dielectric layer being disposed between the recording layer and the reflective layer.

13. A thin film structure as defined in claim 12, wherein the optically decodable data encoded in the recording layer is erasable.

14. A thin film structure for storing data and having optically-variable properties, for the prevention of counterfeiting and forgery, comprising:

a substrate; and, a thin film multilayer interference coating carried by the substrate for recording optical decodable data, said interference coating defining a Fabry Perot structure and being of a thickness suitable for providing thin film interference effects such that colours seen vary with a change of viewing angle, the thin film multilayer interference coating including at least a spacer layer that is a transparent layer and at least another layer of another material that is reflective selected from the group consisting of metals, dielectrics, and semiconductors, the interference coating also including a recording layer for storing optically decodable data, the recording layer being a light absorbing material selected from the groups of dielectrics, metals and semiconductors, the transparent spacer layer being a dielectric layer disposed between the recording layer and the at least other layer.

15. An optical data storage and retrieval system having security features, comprising:

a source for generating a coherent light signal for reading stored data;

a thin film structure for storing data and having optically-variable properties, comprising:

a substrate;

a multilayer interference coating carried by the substrate being of a thickness suitable for producing an inherent color shift with a change of angle, said interference coating including a dielectric layer, at least another layer being a different dielectric, a metal or a semiconductor and including a recording layer made of a material selected from the group consisting of light absorbing materials, phase change materials and magneto-optic materials, said recording layer having optically decodable data encoded therein and being positioned to receive and absorb the coherent light signal and to reflect an information containing signal; and, detector means positioned to receive the reflected information containing signal.

* * * * *